May 19, 1959

J. A. VILLEMONT 2,886,929

APPARATUS FOR AND METHOD OF TRANSPORTING
AND STACKING SHEETS OF MATERIAL

Filed Nov. 25, 1955

INVENTOR
Jules A. Villemont
BY
ATTORNEY

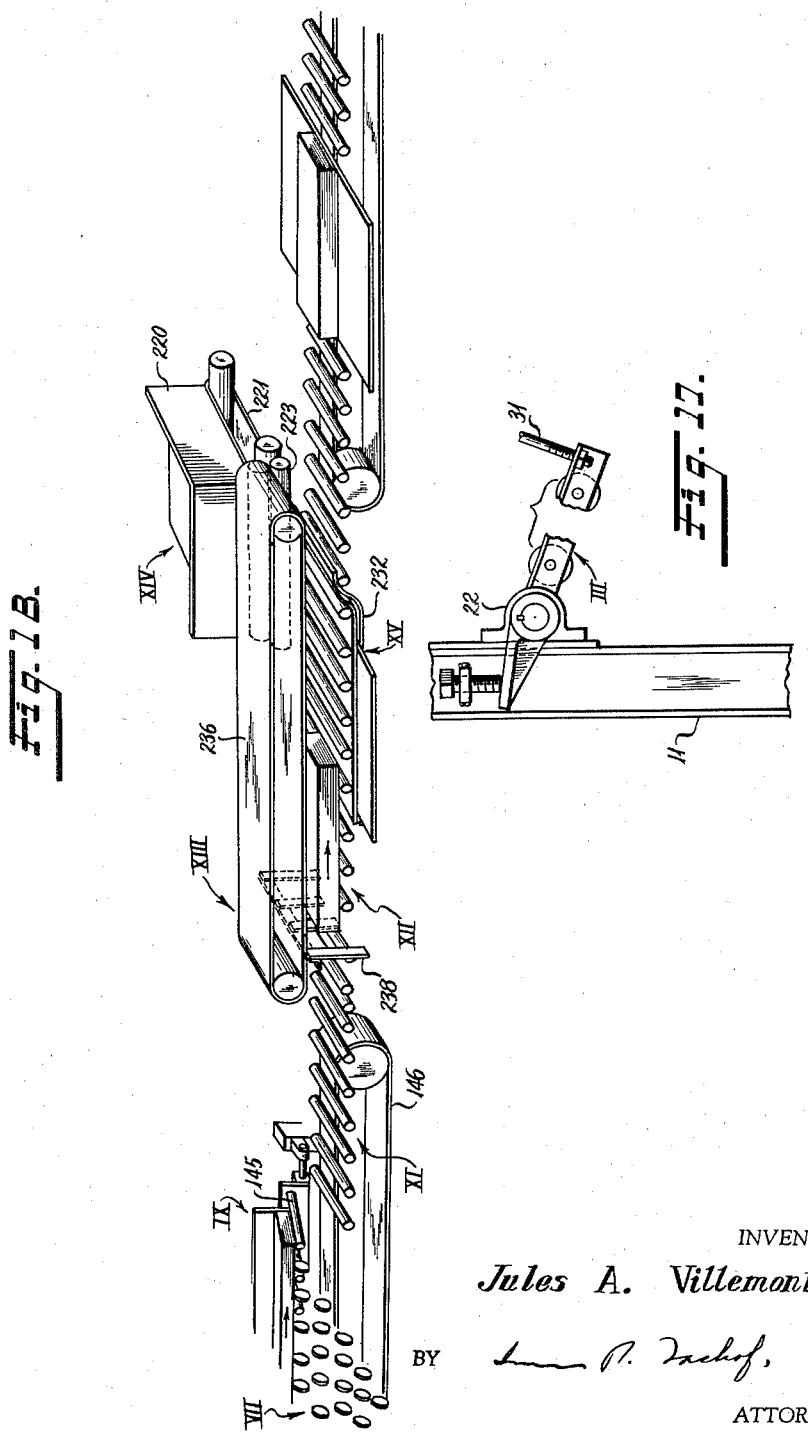

May 19, 1959
J. A. VILLEMONT
2,886,929
APPARATUS FOR AND METHOD OF TRANSPORTING
AND STACKING SHEETS OF MATERIAL
Filed Nov. 25, 1955
8 Sheets-Sheet 3
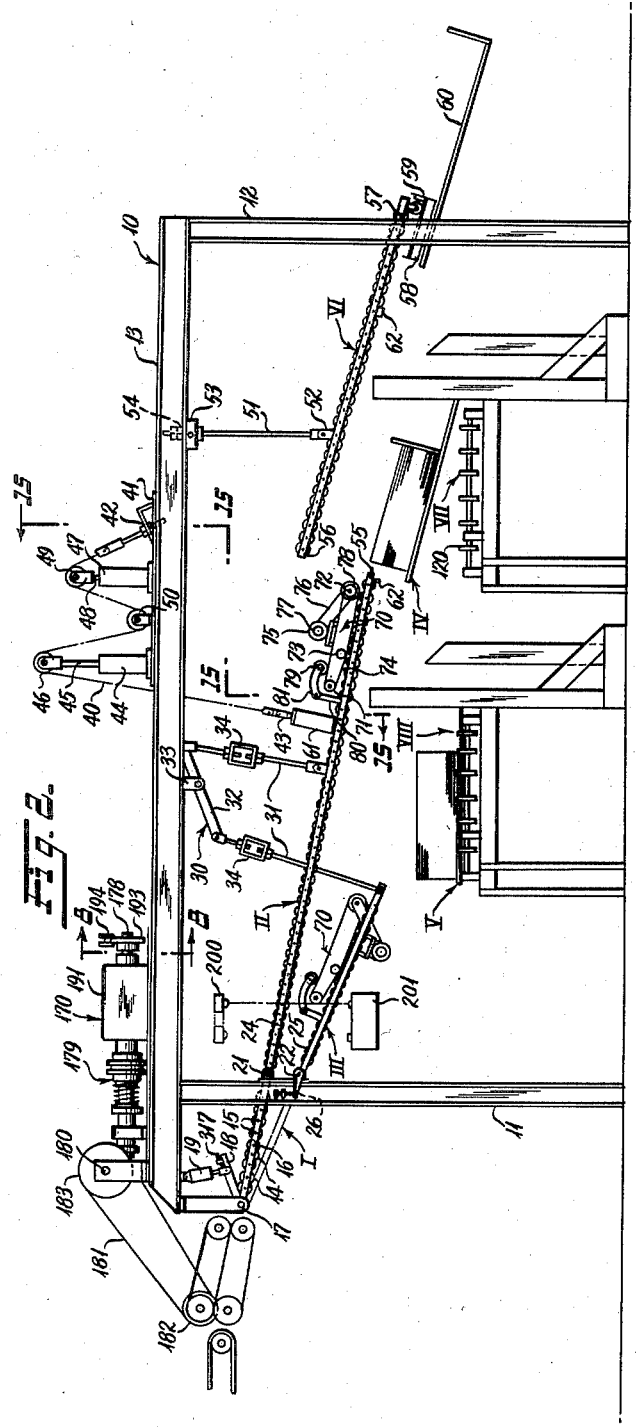
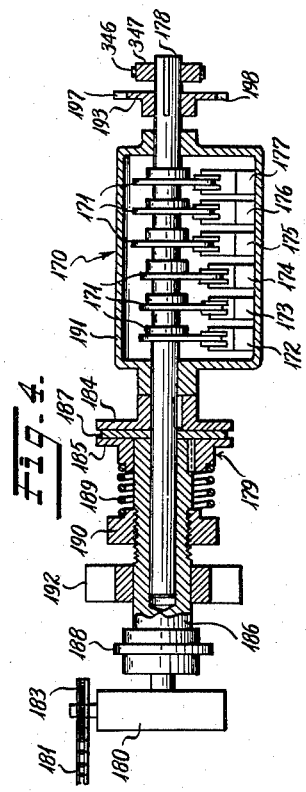
INVENTOR.
Jules A. Villemont
BY
ATTORNEY

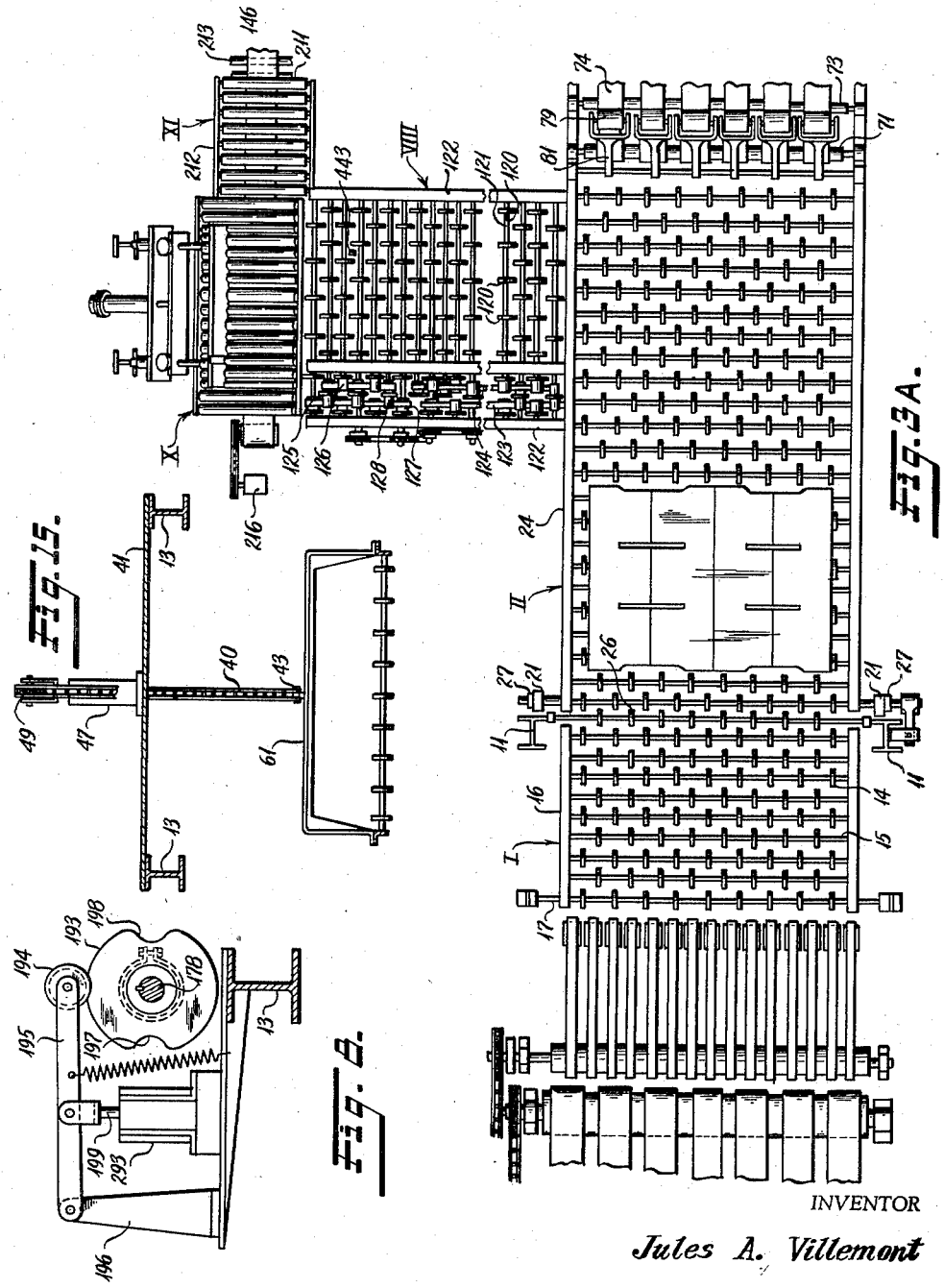

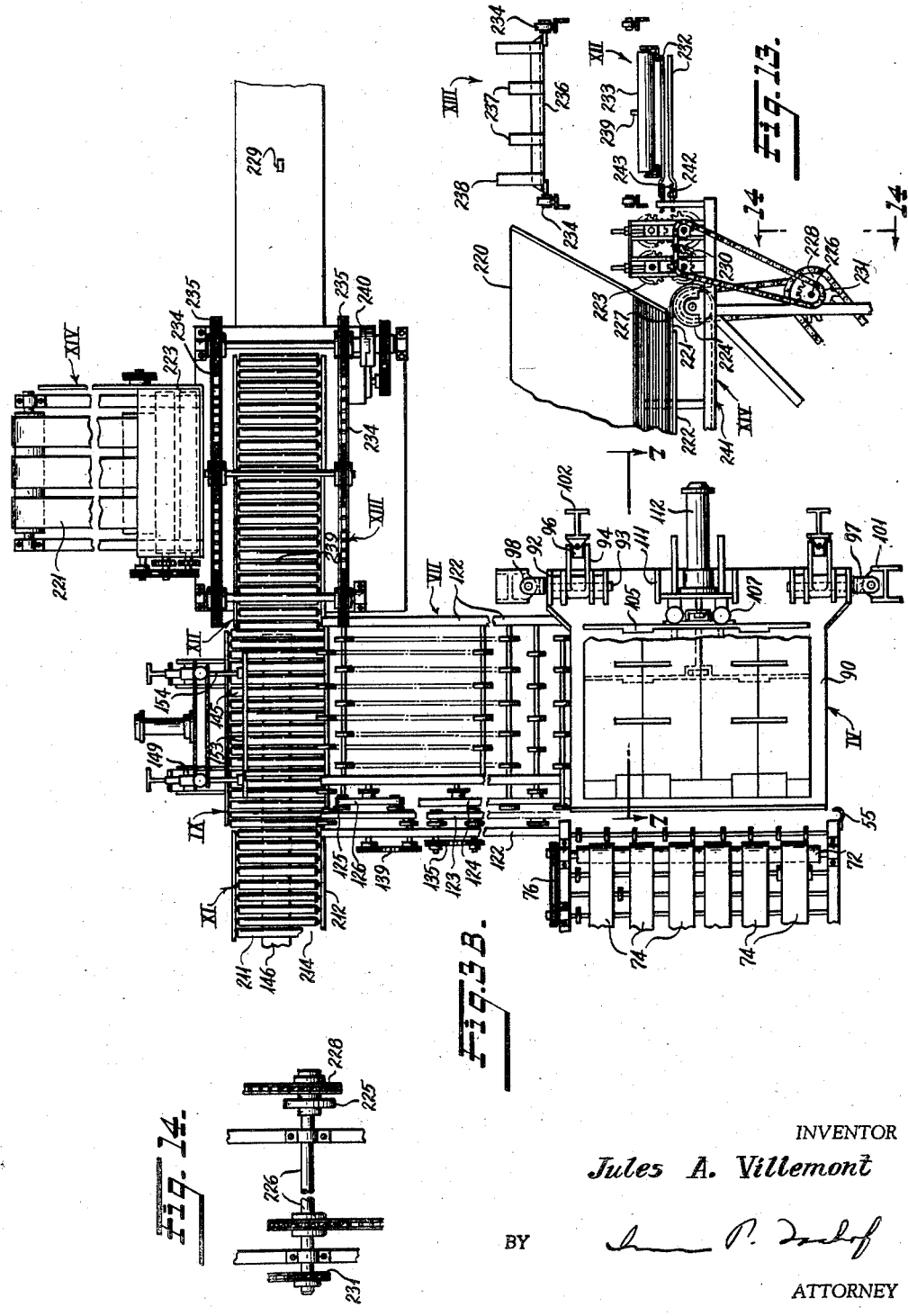

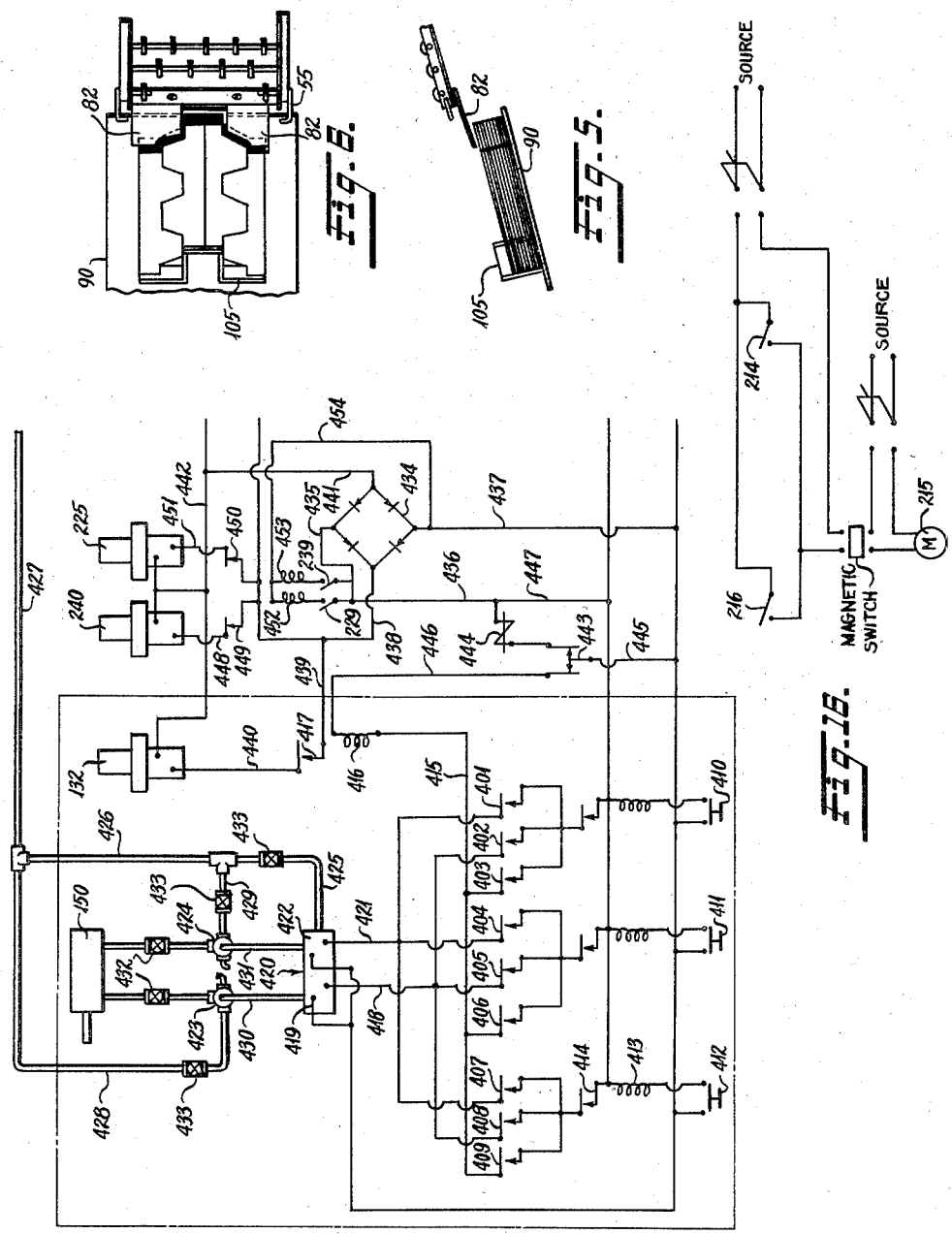

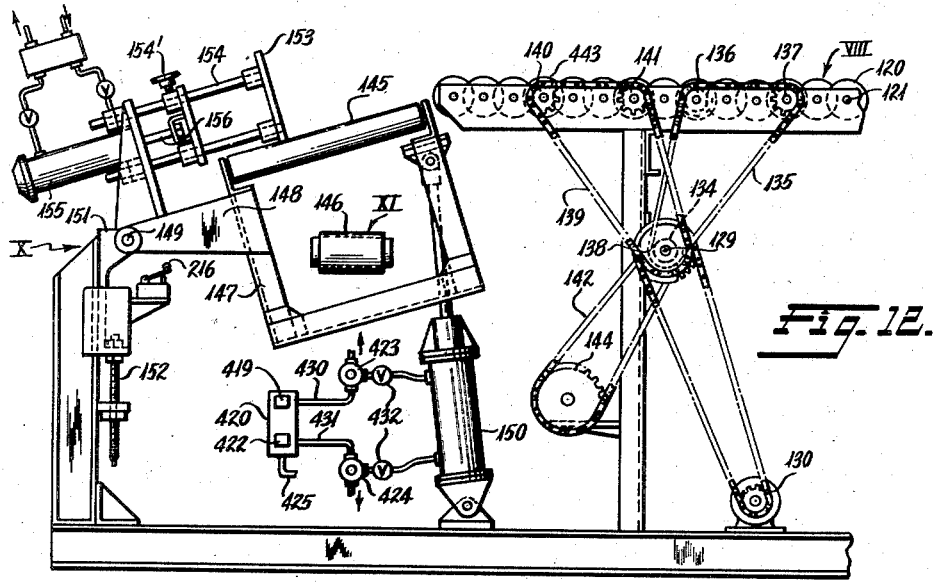

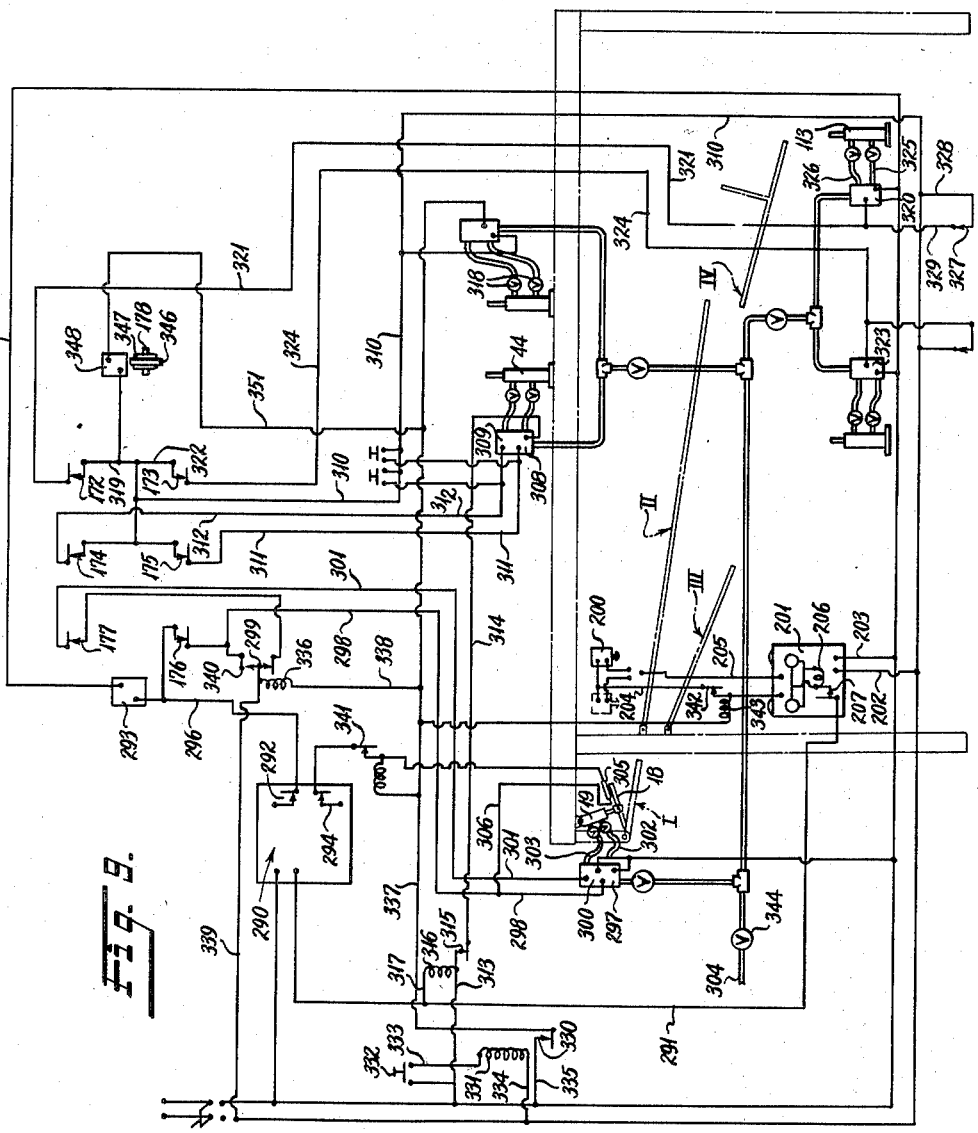

United States Patent Office 2,886,929
Patented May 19, 1959

---

2,886,929

APPARATUS FOR AND METHOD OF TRANSPORTING AND STACKING SHEETS OF MATERIAL

Jules Andrew Villemont, New Orleans, La.

Application November 25, 1955, Serial No. 549,121

23 Claims. (Cl. 53—164)

The present invention relates to apparatus for transporting and stacking sheet material and more particularly to apparatus for automatically stacking shingles which is adaptable to the automatic stacking of the various different types of shingles which re normally produced such as "thick butt" shingles, "hexagon" shingles and "sta-fast" shingles.

While the invention is particularly adapted to the handling of asphalt shingle products, it will be appreciated that the invention is equally employable with sheets of material in general. In order to illustrate the invention, the novel apparatus which has been developed will be described in conjunction with its use in the transporting and stacking of shingles but it will be appreciated that this description is merely illustrative.

In accordance with the invention, shingles are continuously supplied and separated and the separated shingles are sequentially fed in groups to upper and lower deliveries from which they are conveyed to upper and lower bundle make-up trays. When the bundle make-up tray is filled with the desired number of shingles, the tray is lowered and the formed bundle is conveyed away at right angles to the direction in which it was conveyed to the bundle make-up tray. The shingle bundles delivered from the bundle make-up trays are carried to a live roll conveyor positioned in a direction parallel to the direction in which the shingles were fed to the bundle make-up trays.

The live roll conveyor contains separate bundle receiving means for receiving bundles from the upper and lower bundle make-up trays respectively. The bundles so received are conveyed away by the live roll conveyor and delivered to a gravity conveyor where a carton is dispensed into a position beneath the gravity conveyor and pusher members align the shingle bundle with the carton and force the carton into a position directly underlying the shingle bundle. Thus, the shingles which have been continuously formed are automatically stacked into bundles and deposited on cartons by the apparatus of the invention.

The shingle bundle with underlying carton so produced is then conveyed to machinery which folds the carton and ties the folded carton. This folding and tieing equipment is conventional and forms no part of the present invention.

The invention includes means for rendering operation automatic and for enabling this automatic operation to be adapted to differing situations, as for example, the supply of different types of shingles. The invention also includes means for rejecting defective shingles without disturbing the automatic operation of the apparatus. The invention also includes various novel subcombinations of stacking apparatus as will be more particularly pointed out hereinafter.

An object of the invention is the provision of automatic stacking apparatus which is adaptable to the automatic conveying and stacking of the variety of different types of shingles which are produced by the ordinary shingle manufacturer.

Another object of the invention is the provision of stacking apparatus which can be efficiently employed in the stacking of asphalt shingles which, as received, are flexible and deformable.

A further object of the invention is the provision of stacking and conveying apparatus adaptable to the stacking and conveying of products in sheet form which are flexible and deformable and provided with means whereby defective products can be rejected without disturbing the automatic operation of the apparatus.

Another object of the invention is the provision of a live roll conveyor provided with means to receive stacked bundles at a plurality of separate stations.

Another object of the invention is the provision of novel means for controlling the delivery of shingles so that delivery of shingles is performed under constantly uniform conditions as the shingle bundle is formed.

A still further object of the invention is the provision of novel shingle receiving means constituting a bundle make-up tray in accordance with the invention.

Still another object of the invention is the provision of novel means for placing a formed shingle bundle upon a carton blank in aligned position with respect thereto.

A further object of the invention is the provision of a novel procedure for transporting and stacking sheets of material whereby bundles of stacked sheets are continuously stacked and delivered from a single conveyor.

Other and further objects of the invention will become apparent from the description which follows taken in conjunction with the accompanying drawings in which:

Figs. 1A and 1B together constitute a diagrammatical illustration of a shingle stacking and conveying apparatus in accordance with the invention and showing the sequence of operation which is employed starting with cut shingles, which are cotinuously fed forwardly from an inspection station, and ending with a bundle of shingles positioned upon a carton blank ready for folding and tieing by conventional machinery forming no part of the invention;

Fig. 2 is a side elevation of a portion of a shingle stacking apparatus constructed in accordance with the invention and showing a separating section, the oscillator, the upper and lower deliveries, and the upper and lower bundle make-up trays and unloaders therefor;

Figs. 3A and 3B together constitute a plan view of a shingle stacking apparatus constructed in accordance with the invention and showing the separating section, the oscillator, the upper delivery, the upper bundle make-up tray, a portion of the unloading wheels for both the upper and lower bundle make-up trays, the live roll conveyor and the bundle receivers which receive bundles from the upper and lower bundle make-up trays respectively.

Fig. 4 is a side elevation in section showing the cam switch employed to control the stacking portion of the apparatus of the invention;

Fig. 5 is a side elevation showing adaptation of the discharge end of the deliveries to permit the simultaneous release of hexagon shingles;

Fig. 6 is a plan view of the structure shown in Fig. 5;

Fig. 7 is a section taken on line 7—7 of Fig. 3B;

Fig. 8 is a section taken on line 8—8 of Fig. 2;

Fig. 9 is a wiring diagram illustrating the manner in which the stacking portion of the apparatus is wired;

Fig. 10 is a wiring diagram illustrating the manner in which one of the bundle make-up trays is operated and includes the wiring employed to operate the carton dispenser and pusher device;

Fig. 11 is an end view showing the construction of one of the unloaders;

Fig. 12 is an end view of one of the bundle receivers and includes a side elevation of a portion of one of the bundle unloaders;

Fig. 13 is a side elevation of the carton dispenser and includes an end view of the pusher device and the gravity conveyor associated therewith;

Fig. 14 is a section taken on the line 14—14 of Fig. 13;

Fig. 15 is a section on the line 15—15 of Fig. 2;

Fig. 16 is a wiring diagram showing operation of the live roll conveyor; and

Fig. 17 is a fragmentary view on an enlarged scale showing the manner in which the lower delivery III is mounted.

Figure 1A:
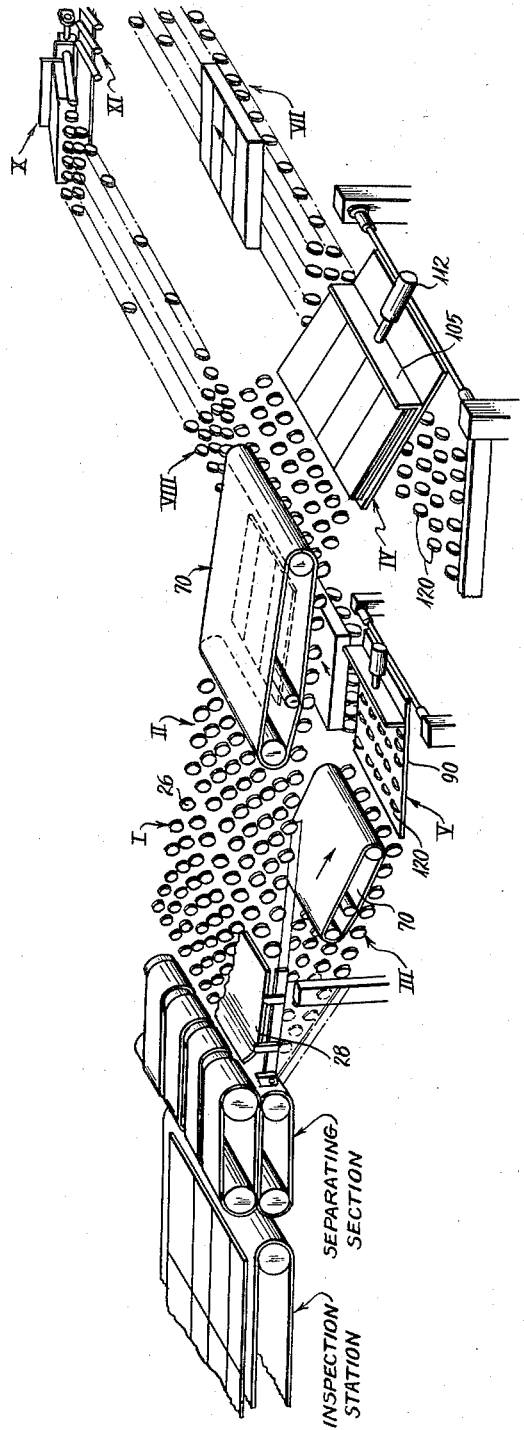

The overall operation of the conveying and stacking apparatus of the invention will be apparent from Figs. 1A and 1B which together form a single figure of the drawings.

Shingles are continuously produced in conventional manner and continuously severed into the desired shape and the shingles so formed are continuously supplied to an inspection station which is shown in the upper left-hand corner of Fig. 1A. It will be noted that the shingles are end to end, there being no separation between the transverse rows of shingles. Shingles delivered to the inspection section are longitudinally separated into transverse rows by a separating section, this separation being obtained by operating the conveyors forming the separating section at a higher speed than the conveyors forming the inspection section.

To this point there has been no change in the manner in which shingles are currently handled, operation to this point being only adapted to the conveying and stacking of shingles in accordance with the present invention.

Shingles delivered from the separating section are deposited upon an oscillating feeding member I, the oscillating member I having at least two positions, an upper position as indicated by solid lines and a lower position as indicated by broken lines. In the upper position of the oscillating member I, shingles are fed to an upper delivery II and when the oscillating member I is in its lower position, shingles are delivered to the lower delivery III.

The oscillating member I delivers shingles in predetermined quantities from one of its positions to the corresponding delivery. When the predetermined quantity of shingles has been delivered, the oscillating member I shifts to its other normal position so that the same predetermined quantity of shingles can be fed from the second position to the other delivery. This alternating cycle of operation is continued and in this manner, shingles are handled and stacked despite the fact that they are being cut and delivered to the stacking apparatus at a very high and continuous rate.

Upper delivery II conveys shingles to a bundle make-up tray IV and delivery III delivers shingles to bundle make-up tray V. It will be observed that the bundle make-up trays IV and V are longitudinally separated. A retarding belt may be employed to slow the velocity of the shingles to a speed intermediate the velocities of shingles in the separating section and in the inspection station so that the danger of damaging by buckling the shingles which are delivered to the bundle make-up trays is reduced. Since various types of shingles are intended to be stacked and conveyed by the apparatus of the invention, the velocity of the retarding belts must be slightly higher than the highest speed at which shingles are cut.

In accordance with the invention, while one bundle make-up tray is being stacked, the other is being unloaded. Fig. 1A shows bundle make-up tray IV in position for receiving shingles from upper delivery II while bundle make-up tray V is shown in a lowered position in which shingles already received are deposited upon unloading wheels to be conveyed away. The unloading wheels for the bundle make-up tray IV are indicated at VII while unloading wheels for the bundle make-up tray V are indicated at VIII. Should a section of shingles be considered defective, these defective shingles are supplied to the upper delivery II which is elevated as hereinafter described so that the shingles on the upper delivery II are fed to a conveyor VI overlying the bundle make-up tray IV.

Formed bundles which are removed and conveyed away from the bundle make-up trays IV and V by the unloading wheels VII and VIII respectively are carried to a live roll conveyor having separate bundle receiving means IX and X for receiving bundles from the unloading wheels VII and VIII respectively. The bundle receiving means IX and X are positioned at spaced apart points along the length of a live roll conveyor and form a part of the live roll conveyor which, as modified by the inclusion of the bundle receiving means IX and X, is indicated at XI.

Thus, bundles formed on make-up tray IV are conveyed away by unloading wheels VII, deposited on bundle receiver IX which is then lowered to form a part of the live roll conveyor XI and the bundle so deposited is then conveyed away by the live roll conveyor. The same is true for bundles formed on bundle make-up tray V which are conveyed away by unloading wheels VIII, deposited on bundle receiver X, which is then lowered to enable the bundle to be conveyed away by the live roll conveyor XI. It will be observed that the bundle receiver IX must be in its lowered position in which it forms a part of the live roll conveyor XI when bundles are conveyed away from the bundle receiver X, since otherwise, bundles conveyed away from the bundle receiver X would be obstructed by the bundle receiver IX.

Bundles conveyed by the live roll conveyor XI are deposited upon a gravity conveyor XII and a pusher device XIII cooperates with the gravity conveyor XII to grasp bundles deposited thereon and move these bundles forwardly. Cartons are fed from a carton dispenser XIV and deposited in carton receiving guides XV positioned beneath the gravity conveyor XII. The pusher XIII is also designed to grasp the rear of the carton blanks which are held in the carton receiving guides XV so that the shingle bundle and the carton blank will be aligned with respect to one another and the two fed forwardly in aligned position. The carton guide then directs the carton blank upwardly between two of the rollers constituting the gravity conveyor XII so that the shingle bundle is deposited upon the carton blank in aligned position with respect thereto, the shingle bundle with underlying carton blank constituting the product of the apparatus of the invention.

Referring to Fig. 2, the operation and construction of the stacking portion of the apparatus of the invention will become apparent. As previously indicated, shingles are continously supplied as formed to an inspection station where they are delivered to more rapidly moving conveyors constituting a separating section where the individual shingles are longitudinally separated and the so separated shingles are then fed to the stacking portion of the apparatus of the invention. The stacking portion comprises oscillating member I, upper delivery II, lower delivery III and bundle make-up trays IV and V. The oscillating member I, the upper delivery II and the lower delivery III are supported by a frame 10 which comprises vertical supports 11 and 12 and horizontal supporting members 13. The frame 10 also carries means for shifting the oscillating member I and means for varying the position of the upper and lower deliveries II and III. In addition, the frame 10 may carry drive means for the oscillating member I, a reject conveyor VI and means actuated by the shingles supplied for controlling the operation of the deliveries II and III, the bundle make-up trays IV and V, the unloading wheels VII and VIII and the bundle receivers IX and X so that these various means may be operated in timed relation as will be more fully described hereinafter.

The oscillating member I is preferably a gravity wheel conveyor in which a plurality of wheels 14 are mounted on shafts 15 supported by a frame 16. Oscillating member I slopes towards its discharge end when in either one of its two normal positions, the purpose being to facilitate the movement of the shingles discharged from the separating section under least possible resistance and without the aid of additional equipment. The wheels 14 are preferably staggered to present an even surface to the shingles to prevent the shingles from becoming caught or "hung-up" by the wheels. The wheels 14 are provided with ball bearings to reduce friction and are spaced by tubular spacers mounted on the shafts 15 between the wheels 14 so that the wheels are positioned and independently rotatable. The frame 16 is pivotally secured at 17 to a portion of the frame 10 so that shingles fed from the separating section are deposited upon the wheels 14 of the frame 16. While the invention is not limited to any particular means of diverting the flow of shingles between the upper delivery II and the lower delivery III, it is preferred, as shown, to have the pivot 17 placed on the rearward portion of the frame 16 and to have the shingles supported by the wheels 14 irrespective of whether the upper or lower delivery is to be supplied.

Means are provided to pivotally shift the frame 16 between an upper position (shown in full lines) in which the frame 16 is aligned with the upper delivery II and a lower position (shown in broken lines) in which the frame is aligned with the lower delivery III. For this purpose, a bar 18 is fixedly keyed to the pivot 17 and an air cylinder 19 is pivotally secured at one end to the horizontal frame 13 and at the other end to the bar 18 so that operation of air cylinder 19 will pivot the bar 18 and hence pivot the frame 16. Many equivalent constructions will be immediately apparent.

As can be seen in Fig. 1A, the oscillator I can be provided with a superposed deflector 28 to facilitate high speed operation. Deliveries II and III are positioned one over the other and, except for their respective lengths, are identical in every respect. The deliveries are gravity wheel conveyors which slope toward their discharge ends and are constituted by wheels mounted on shafts supported in frames in a manner identical to that described in connection with the oscillating member I. Deliveries II and III are pivotally secured at their receiving ends by brackets 21 and 22 to the vertical supports 11. As shown, the receiving ends of deliveries II and III are separated in a vertical plane so that an opening is provided to permit passage of shingles from the oscillating member I to the lower delivery III. The brackets 21 and 22 are rigidly secured to the vertical supports 11 and serve as pivot bearings for sidewardly extending cylindrical projections secured to the delivery frames 24 and 25.

Interposed between the forward end of the oscillating member I and the receiving ends of the deliveries II and III are independently mounted wheels 26 which serve to fill the gap therebetween. As will be evident, while a single row of wheels 26 may be sufficient to fill the gap between the forward end of the oscillating member I and the receiving end of delivery II, a greater number of wheels 26 may be required to fill the gap between the forward end of the oscillating member I and the receiving end of the lower delivery III. Preferably, the wheels 26 are staggered to conform with the staggering of the wheels in the respective deliveries and with the wheels in the oscillating member I. Deliveries II and III are positioned laterally by means of the brackets 21 and 22 in conjunction with set collars 27 (see Fig. 3A) which may be threadedly secured to the outer extremities of the cylindrical pivot secured to the frames 24 and 25.

The deliveries II and III are secured together by means of a linkage 30, identical linkages being preferably employed at each side of the frames 24 and 25, the linkage 30 functioning to raise the discharge end of the delivery II as the discharge end of the delivery III is lowered or vice versa. As can be seen in Fig. 2, the linkage 30 comprises arms 31 the lower ends of which are pivotally secured to the delivery II and slidably secured to delivery III and the upper ends of which are pivotally secured to a rocker arm or fulcrum 32 which is pivotally secured to the horizontal support 13 by means of a bracket 33. Turnbuckles 34 may be employed on the arms 31 so that the lengths of the arms 31 may be adjusted as desired.

Since it is desired that the discharge ends of the deliveries II and III traverse identical distances, and since the arm 31 is slidably secured to the lower delivery at a point close to the discharge end thereof while the other arm 31 which is pivotally secured to delivery II is secured at a point spaced from the discharge end of the delivery II, rocker arm 32 is therefore pivotally secured to bracket 33 at a point off center so that the desired travel of the deliveries is obtained. Thus, the distance traversed by the discharge ends of deliveries II and III is maintained equal while the length of the rocker arm or fulcrum 32 is held to a minimum. It is also desirable that the downward travel of delivery III be checked without limiting the upward movement of delivery II. For this purpose, frame 25 of delivery III is slidably secured to the arm 31 and bears downwardly upon a collar threadedly secured thereon. Additionally, the pivot shaft supported by brackets 22 is provided with stop arms keyed thereon which bear upwardly when the delivery III reaches its lower limit against an adjustable stop mounted on the support 11. Thus, the plates 82 (Fig. 6) are prevented from striking the bundle receiving tray V when the delivery II is raised to reject defective shingles. As will be obvious, considerable latitude in construction is permissible with regard to the specific construction of the linkage 30.

The free or discharge end of the upper delivery II is moved by means of a cable 40 which is anchored to the horizontal support 13 by means of a cross bar 41 and a bracket 42, the other end of the cable 40 being secured to the frame 24 of the delivery II by means of a take-up screw 43. An air cylinder 44 bears upwardly against the cable 40, the air cylinder 44 being provided with a piston rod 45 which carries a sprocket 46 at the free end thereof, the cable 40 being trained over the sprocket 46 so that operation of the air cylinder 44 serves to raise or lower the upper delviery II and hence to have the opposite function upon the lower delivery III.

Adjacent to the air cylinder 44 is a second air cylinder 47 provided with a piston 48 to the free end of which is secured a sprocket 49 and the cable 40 is trained over the top of the sprocket 49, under a sprocket 50 secured to the horizontal support 13 and then upwardly over the sprocket 46 and thence to the take-up screw 43 on the upper delivery II. Operation of the air cylinder 47 will have the same result as operation of the air cylinder 44 to thereby enable the upper delivery II to be elevated without altering the position of the air cylinder 44. This feature is employed in rejecting the defective shingles without disturbing the automatic sequential timing of the automatic apparatus of the invention.

The air cylinder 44 functions to maintain the desired spatial relationship between the discharge ends of deliveries II and III and the bundle make-up trays IV and V. Thus, as the level of the shingles on the bundle make-up tray being stacked rises, the discharge end of the delivery which is delivering shingles is raised correspondingly to insure the maintenance of a proper distance therebetween. As the delivery which is delivering shingles is raised, the other delivery is simultaneously lowered so that the other delivery will be ready to initiate delivery of shingles to its empty tray when delivery of shingles to the tray being stacked is completed. This cycle is repeated continuously as bundle make-up trays IV and V are alternately stacked and unloaded and is utilized irrespective of the product or type of shingle being stacked.

Air cylinder 44 is automatically operated and controlled, as will be more fully described hereinafter. The air cylinder 44 is moved at a velocity which is proportional to the rate at which shingles are being delivered by the oscillating member I. Each time a row of shingles is discharged by oscillating member I, air cylinder 44 moves the deliveries II and III a distance equal to the thickness of one shingle, and in this manner, the desired difference in elevation between the discharge ends of the deliveries and the level of shingles on the tray being stacked is maintained.

It is desired that defective shingles be removed and not permitted to enter the bundle make-up trays on which only first quality shingles are stacked. It is important, in accordance with the invention, that removal of defective shingles not disturb the automatic operation of the stacking and conveying apparatus. More particularly, removal of defective shingles must be achieved with only minor disturbance of the shingle manufacturing operations and without altering any of the following:

(1) The means for counting the satisfactory shingles which are delivered by the oscillating member I (defective shingles must not be counted, counting being resumed when satisfactory shingles are once again supplied).

(2) The oscillating member I (after all defective shingles have been rejected, the oscillating member I must automatically resume the position it was in when delivery of satisfactory shingles was discontinued).

(3) Deliveries II and III (the proper delivery position of the delivery which was being used must be resumed when satisfactory shingles are again supplied).

(4) The timed relationship between the bundle make-up trays IV and V and the deliveries II and III, on the one hand, and the bundle receivers IX and X, on the other hand, must be maintained.

These results may be obtained in a variety of ways. Of course, defective shingles can be removed before they reach the apparatus of the invention since this apparatus is actuated only by shingles delivered to it. This is not always feasible since it may require modification of existing plant equipment which is not desirable. It is, therefore, preferred that the apparatus of the invention include means for rejecting defective shingles.

At the very least, rejection of defective shingles by the apparatus of the invention requires that the counting means be rendered inoperative so that the main control mechanism becomes inactive, and in addition, movement of either the oscillating member I or either or both of the delivery members II and III to enable the flow of shingles to be diverted must not prevent automatic return of these members to the position they occupied immediately prior to the rejection operation.

One way of rejecting defective shingles is to provide means for rendering the counting means inoperative in conjunction with the provision of a third position as for example a discharge position beneath the lower delivery III. One simple way of obtaining this third position would be to disconnect the air cylinder 19 from the bar 18 and permit the frame 16 to fall upon a suitably positioned abutment. Many other manual as well as semi-automatic alternatives will be immediately apparent.

Preferably, rejection of defective shingles is accomplished by having the oscillating member I move to its upper position where it delivers shingles to upper delivery II and raising the upper delivery II in a manner which will not permanently disturb the position of the deliveries II and III as determined by the air cylinder 44.

Thus, shingles to be rejected are delivered to the upper delivery II by the oscillating member I and the discharge end of the upper delivery II is elevated to a higher level than it would ever reach in stacking the bundle make-up tray IV so that shingles discharged from delivery II are received by reject conveyor VI which may also be of the gravity type.

Elevation of delivery II to reject position is accomplished by means of air cylinder 47 which moves between a fully protracted and fully retracted position only. Normally, air cylinder 47 is fully retracted and when rejection is desired, air cylinder 47 is protracted. It will first be observed that when air cylinder 47 is returned to its fully retracted position, the position of delivery II prior to protraction of air cylinder 47 is re-established. It will also be observed that the final elevated position of the discharge end of delivery II is dependent upon the position of delivery II prior to protraction of air cylinder 47. Therefore, if the discharge end of delivery II is above its lowermost position at the time air cylinder 47 is protracted, protraction of air cylinder 47 will raise the discharge end of delivery II to a position above the receiving end of reject conveyor VI.

It is desirable that the discharge end of delivery II coincide exactly with the receiving end of reject conveyor VI when air cylinder 47 is protracted. To enable this, arms 51 are provided, the lower end of the arms 51 being pivotally secured to reject conveyor VI by the brackets 52 and the upper end of arms 51 being slidable in brackets 53 rotatably secured to the horizontal support 13. The upper extremity of arms 51 is threaded to enable stop members 54 to be adjustably secured thereto. Therefore, the lowermost position of the receiving end of reject conveyor VI is determined by the position of the stop members 54 and the arms 51 can slide upwardly within the brackets 53 to permit the receiving end of reject conveyor VI to be elevated.

The discharge end of delivery II is provided with inwardly extending hooks 55 and the receiving end of reject conveyor VI is provided with notches 56. Therefore, when delivery II is elevated by the air cylinder 47 from a position above its lowermost position, the hooks 55 and notches 56 engage one another so that the delivery II and the reject conveyor VI are raised together. The discharge end of reject conveyor VI may be provided with a roller 57 movable upon a platform 58 provided with an abutment 59. The platform 58 may be secured to the vertical supports 12 and a tray 60 for receiving rejected shingles may be secured to the platform 58. Therefore, reject conveyor VI is supported by platform 58 and the abutment 59 as well as by arms 51 and movement of the discharge end of reject conveyor VI with respect to tray 60 is permitted and this movement naturally occurs when the hooks 55 and notches 56 engage one another to raise the receiving end of the reject conveyor VI. The roller 57 is provided with terminal flanges which abut the side walls of the platform 58 and function to laterally position the discharge end of the reject conveyor VI. As will be apparent, separate rollers may be employed instead of the single roller 57 and tracks may be employed instead of the platform 58. If desired, a weight 62 may be secured to the under surface of reject conveyor VI toward the discharge end thereof to insure firm contact between the rollers 57 and the tracks or platform 58.

When the operator detects the presence of defective shingles, the shingle producing machine is slowed so that shingles on the inspection station can be observed and the shingle forming and cutting machine stopped after the last satisfactory shingle has been deposited upon the oscillating member I. At this time, the shingle machine is stopped and operation of the aparatus of the invention is continued until the last satisfactory shingle is deposited upon one of the make-up trays IV or V. When this has occurred, a reject switch is actuated, and the shingle machine is started again. Reject shingles are then conveyed to the tray 60 until all of the defective shingles have been deposited upon the oscillating member I. At this point, the shingle machine is again stopped and when the last defective shingle is in the tray 60, the apparatus of the invention is again started and the shingle machine restarted so that satisfactory shingles are again delivered and the sequence of operation of the apparatus of the invention is resumed.

The cable 40 carries the entire weight of deliveries II and III and is taut at all times. It is preferred to employ a single cable 40 and this is centrally positioned. To prevent cable 40 from interfering with the flow of shingles on delivery II, the cable 40 is secured to a U-shaped bracket 61 by the take-up screw 43 and the legs of the bracket 61 are fastened to the side margins of the frame 24 as can be clearly seen from Fig. 4. Downward movement of delivery II is by gravity and a weight 62 may be secured to the underside of the discharge end of delivery II to assist in this regard.

Each of deliveries II and III are provided with retarding devices 70 which may be identical. The retarding device 70 is constituted by a pulley 71 at the inlet end, a pulley 72 at the exit end and an intermediate pulley 73. A plurality of retarding belts 74 encircle the pulleys 71, 72 and 73. The pulley 71 is positioned a considerable distance above the wheels of the deliveries II and III and the lower run of belts 74 is directed at an angle from pulley 71 by pulley 73, at which point contact is made by the belts 74 with the wheels of the deliveries and this contact is maintained as the belts 74 move from the pulley 73 to the pulley 72. Therefore, a tapering opening is provided for the entrance of shingles between the belts 74 and the delivery wheels to permit passage of shingles having upturned leading ends. The pulleys 71, 72 and 73 span the frames of deliveries II and III and are rotatably supported in bearings mounted thereon. The pulley 72 is driven continuously by motor 75 as by means of a chain 76 operating on sprockets 77 and 78. Belts 74 are maintained under proper tension by rotatable pulleys 79, which act as individual weights, and are pivotally secured to the delivery frames by arms 80 and 81.

In order to insure proper delivery of shingles, it is desirable that the shingles in each transverse row of shingles be simultaneously released by the discharge ends of the deliveries II and III. As can be seen in Figs. 5 and 6, the irregular pattern in which hexagon shingles are cut necessitates the utilization of feed plates 82 which are removably secured to the underside of the discharge end of the delivery frames where they do not interfere with the reject conveyor VI when delivery II is elevated to reject defective shingles. As will be observed from Fig. 6, the feed plates 82 support the outside shingles so that these are released at the same time that the inside shingles are released. The feed plates 82 are removable and used only when hexagon shingles are being stacked.

Shingles discharged from the deliveries II and III are received by the bundle make-up trays IV and V where they are deposited one transverse row atop the other. Each of the bundle make-up trays IV and V are identical although they function individually. Thus, while bundle make-up tray IV is receiving shingles, the other bundle make-up tray V is unloading itself preparatory to receiving shingles during its next loading cycle. The trays are tilted at an angle in order to receive shingles and these trays are then lowered to a horizontal position to permit the shingle bundle on the tray to be unloaded.

Operation of bundle make-up tray IV will be understood from Fig. 7 where the tray is constructed of a flat plate 90 which is provided with perforations 91 through which unloading wheels VII project in order to carry away the formed shingle bundle. The trailing edges of the perforations 91 may be bent downward to prevent the shingles from hanging up. The under surface of plate 90 may be provided with suitable reinforcing stiffeners located so as not to interfere with either the unloading wheels VII or the perforations 91.

The plate 90 is supported at one end only at both sides by brackets 92 which are rigidly secured to the plate 90 and keyed onto shafts 93. Also keyed on the shafts 93 are arms 94 the lower ends of which carry a roller 95 which operates against a wedge 96 to tilt the plate 90. The shaft 93 is journaled in guides 97 and is free to rotate. Guides 97 are slidably mounted on shafts 98 which are rigidly supported at their upper and lower ends by retainers 99 and 100 respectively, the retainers being rigidly secured to supports 101.

Wedge 96 is slidably mounted on the flange of support 102 and is vertically adjustable by stud 103 which projects through lug 104 on the support 102.

The numeral 105 designates a retractable stop which arrests the movement of the shingles being deposited on the plate 90. In view of the irregular outline of the various cutting patterns, it is necessary that different stops 105 be used for each product being stacked, the outline of the stop 105 conforming with the outline presented by each transverse row of shingles.

Stop 105 is secured to retractor 106 by means of a hand wheel stud 107 which engages lug 108 on the stop 105 with a lug 109 on the retractor 106. Retractor 106 is supported by shaft 110 which is slidably mounted in bracket 111 which is securely fastened to the tray 90. Bracket 111 also serves to support air cylinder 112 the piston of which constitutes an extension of the shaft 110.

Plate 90 is moved to its various positions by air cylinder 113 which bears upwardly against angle iron 114 which is secured to the guides 97 to slide guides 97 upwardly along shafts 98. Switch 115 controls the action of retractor air cylinder 112 and is actuated by the motion of one of the guides 97.

When the bundle make-up tray IV is in its shingle receiving position, as shown in Fig. 7, the plate 90 is stacked with shingles until the shingle bundle has been completed. At this point, pressure is released from air cylinder 113 lowering angle iron 114 and hence guides 97 and shafts 93. Therefore, the arms 94 with rollers 95 are lowered and lose contact with wedges 96 to reduce the inclination of plate 90. As the guides 97 move downwardly, switch 115 is contacted to actuate air cylinder 112 and retract the shingle stop 105 so that the stop will not interfere with the transverse movement of the shingle bundle. Further descent of plate 90 lowers the plate onto unloading wheels VII which project through perforations 91 to lift the shingle bundle away from the plate 90 preparatory to removal of the shingle bundle by the unloading wheels VII.

Wedges 210 (Fig. 7) may be removably secured to the plate 90 to support thick butt shingles at the leading edges of the cut-outs which are formed in this type of shingle. The wedges 210 are only used for stacking thick butt shingles and are removed when other products are stacked.

All of the major units of the stacking portion of the apparatus of the invention are controlled by means of a cam switch indicated generally at 170 in Fig. 2. Referring more particularly to Fig. 4, the cam switch 170 comprises six individual cams 171 each of which operates a different one of the switches 172, 173, 174, 175, 176 and 177. The cam switch 170, except for its drive and control, is a conventional unit. The cams 171 are rotated by a shaft 178 which is driven by means of a slip clutch 179, one-half of the slip clutch 179 being connected to the shaft 178 and the other half of which is connected to a continuously driven speed reduction unit 180. The speed reduction unit is driven by means of a chain 181 which operates between the sprocket 182 on the separating section and sprocket 183 on the speed reduction unit 180. Therefore, any change of speed in the separating section affects the cam switch 170.

The slip clutch 179 comprises a friction flange 184 which is keyed to the shaft 178 and a companion flange 185 which is keyed to a sleeve 186 which rotatably surrounds the shaft 178. Between the flanges 184 and 185 is a friction disk 187 and power is transmitted from the speed reduction unit 180 through a coupling 188 to the sleeve 186 and thence through the friction disk 187 to the flange 184 and to the shaft 178 which is keyed thereto. The flange 185 is slidably mounted on the sleeve 186 and is held against the friction disk 187 by means of a spring 189, pressure against the friction disk 187 being controlled by a retainer 190 which is threadedly secured to the sleeve 186.

The cam shaft 178 is rotatably supported by the bearings of a housing 191 which encloses the cams 171 as well as the switches 172 through 177. Suitable bearings for the sleeve 186 are shown at 192. On the end of shaft 178 remote from the sleeve clutch 179 is a disk cam 193 (see also Fig. 8) which functions to control the operation of the switches 172 to 177. Cam follower 194 contacts the disk cam 193 and is rotatably mounted on arm 195 which is pivoted to a fulcrum 196 which may be rigidly secured to the horizontal support 13. It will be observed that the cam disk 193 is provided with two slots 197 and 198 located 180° apart. The slots 197 and 198 serve as locks and when cam follower 194 is in one of these slots, the disk cam 193 is held against rotation and slippage occurs between the flanges 184 and 185. In order for the disk cam 193 to resume rotation, the cam follower 194 must be lifted out of the slot 197 or 198 in whch it is locked and this is accomplished by a solenoid which is directly controlled by a counting device.

The cam switch 170 is a selector switch and the selection of switches is determined by the position of the oscillator I. Thus, when the oscillator is in its upper position, one group of switches is actuated and when in its lower position another group is actuated.

Referring to Figs. 4 and 8, only switches 172, 177 and 174 are actuated when the disc cam 193 is rotated from slot 197 until slot 198 engages the cam follower 194. The other switches 175, 176 and 173 are actuated when the disc cam 193 is rotated from slot 198 until slot 197 engages the cam follower 194.

Switch 172 controls the operation of air cylinder 113 which actuates the bundle make-up tray IV and switch 173 controls the air cylinder which operates bundle make-up tray V. Switch 174 controls the compensating air cylinder 44 when oscillator I is in its upper position and switch 175 controls the same unit for operation when the oscillator I is in its lower position. Switch 176 controls the operation of air cylinder 19 which moves the oscillator I from its lower to its upper position and switch 177 actuates the air cylinder 19 in the opposite direction.

Lamps 200 cast a beam across the path of the shingles immediately beyond the oscillator I and the beam of light is intercepted by a photoelectric cell 201. As can be seen, the lamps 200 and photoelectric cell 201 are located at a distance from the end of the oscillator I so that when the beam of light is broken by the passage of a shingle, the rear of the shingle will be clear of the oscillator I. Since the length of the shingles may vary depending upon the type of shingle being stacked, a plurality of lamps 200 may be employed or a single lamp 200 may be used, the single lamp being moved longitudinally to adjust for the length of the shingle being stacked. The photoelectric cell 201 actuates a counter which, when the desired number of shingles has been counted, actuates the solenoid 293 which causes rotation of the cam disk 193.

The electric circuits which control the stacking portion of the apparatus of the invention are diagrammatically presented in Fig. 9 where photoelectric cell 201 actuates counter 290 via wire 291, the counter being of conventional type as for example the conventional Eagle microflex instantaneous reset counter. This counter will have been manually set to operate when the desired number of shingles has passed the photoelectric cell 201. Photoelectric cell 201 is connected to the source of electric current by wires 202 and 203, and wires 204 and 205 carry current from cell 201 to the lamps 200. Each impulse received by the cell 201 energizes relay coil 206 which actuates switch 207.

Within the counter 290 is a master switch 292 which is normaly open and which is momentarily closed when the desired number of shingles has been counted to energize solenoid 293. The counter 290 contains a second switch 294 which opens when the switch 292 closes and closes when the switch 292 opens. The switch 294 functions to maintain the air cylinder 19 in retracted position as will be more fully described hereinafter.

The solenoid 293 controls the operation of the cam switch 170 as previously indicated. The positive terminal of the solenoid 293 is connected to one leg of a source of electric current by wire 295 and to negative terminal of switch 292 by wire 296. Solenoid 293 is energized by switch 292, and when energized, cam follower 194 (Fig. 8) is lifted and the cam shaft 178 is free to rotate and operate the various switches 172–177. Rotation of shaft 178 of cam switch 170 is instantaneous and starts immediately when the cam follower 194 releases the disk cam 193. Therefore, after the solenoid 293 is deenergized, cam follower 194 rides on the cam disk 193 and the plunger 199 of the solenoid 293 does not return into its coil until the cam follower 194 has entered one of the slots 197 or 198.

The circuit for controlling the operation of the oscillator I is energized directly by switch 292 through either of the switches 176 or 177 which determine the direction in which the oscillator I will move. Switch 176 controls air cylinder 19 through solenoid air pilot valve 297 which is connected to switch 176 by wire 298. Switch 177 is connected via double throw switch 299 to solenoid actuated air pilot valve 300 by means of wire 301. The double throw switch 299 is used for the rejection of defective shingles and its function will be later described in greater detail.

Switch 176 is closed when the cam follower 194 is locked in slot 198. When the circuit is energized by switch 292, solenoid actuated air pilot valve 297 is immediately energized to actuate a four-way air pilot valve which admits air through tube 302 to the bottom of air cylinder 19 to retract the piston and raise the oscillator I to an upper position. When the cam follower 194 is locked in slot 197, switch 177 will be closed and switch 176 will have been opened just before the cam follower 194 was locked in the slot 197. Solenoid 300 is energized in a similar manner and air is admitted through tube 303 to the top of the air cylinder 19 to protract the piston thereof and lower the oscillator I.

The four-way solenoid operated air pilot valve and the air cylinder 19 are conventional units and the air pilot valves are connected by suitable tubing or piping to a source of compressed air supply 304. When one of the pilot valves is open to admit air to its end of the cylinder, the other pilot valve is open to exhaust and the air piston is free to move. The valves are normally open to exhaust when their solenoids are deenergized.

When oscillator I is in its lower position, the piston of air cylinder 19 is fully extended and is held in this position by the weight of the oscillator I. However, when oscillator I is in its upper position, the piston of air cylinder 19 is retracted and the weight of the oscillator tends to pull the piston outwardly to protract the same. This is prevented by the provision of a mercury switch 305 which is carried by the arm 18 of the oscillator I so that contact is made by the mercury switch 305 when the oscillator I is in its upper position.

The mercury switch 305 is connected to the switch 294 in the counter 290 and to the solenoid air pilot valve 297 by wire 306. Therefore, when oscillator I is in its upper position, switch 305 is closed and an electric circuit is established to maintain the solenoid air pilot valve 297 energized to thereby retain the retracted position of the air cylinder 19 until the switch 294 is opened by the closing of switch 292. When the switch 292 is again opened, the switch 294 will close again but the solenoid air pilot valve 297 will not be affected because the mercury switch 305 is only closed when the oscillator I is in its upper position.

Speed control valves may be employed to control the operating speed of the air cylinder 19.

The operation of the compensating air cylinder 44 is controlled by the cam switch 170 but is not directly affected by the counter 290. Cam switches 174 and 175 are utilized to control the operation of the air cylinder 44 through the solenoid actuated pilot air valves 308 and 309.

The switches 174 and 175 are connected to the negative leg of the source of electrical energy by wire 310 and to the solenoids 308 and 309 by wires 311 and 312. The positive terminals of the solenoids 308 and 309 are connected to the other terminal of the source of electrical energy by wires 313 and 314 between which is interposed a timing switch 315 actuated by a coil 316. The negative terminal of coil 316 is connected to wire 291 by wire 317. Since the wire 291 is connected to the photoelectric cell 201, the timing device 315 is governed by the rate at which passage of shingles actuates the photoelectric cell 201. More particularly, impulses from the photoelectric cell energize the coil 316 which actuates timing switch 315 to energize the circuit to both of the solenoids 308 and 309. The impulse frequency is such that timing switch 315 remains closed as long as impulses are being received. When the impulses are stopped, the timing switch 315 also stops which deenergizes the circuit to solenoids 308 and 309 and thus maintain the relationship between the deliveries II and III and their respective bundle make-up trays as has been previously described.

When the cam switch 170 is being rotated from slot 198 to slot 197, oscillator I will be in its upper position and the cam switch 174 will be closed completing the circuit to solenoid 309 allowing the piston of air cylinder 44 to respond to the action of timing device 315. When the cam switch 170 is rotated from the slot 197 to slot 198, the oscillator I will be in its lower position and cam switch 175 will be closed completing the circuit to solenoid 308 and allowing air cylinder 44 to operate in a similar manner but in the opposite direction.

Solenoid actuated valves 308 and 309 are normally closed to exhaust. Thus, when the solenoids are deenergized both sides of piston of air cylinder 44 are under equal pressure and therefore balanced. Thus, when one of the solenoids is energized, its valve will open to exhaust, bleeding off air from the cylinder and the piston of air cylinder 44 will be moved by air entering the cylinder 44 through the opposite valve. When the valve is then deenergized, the valve will close to exhaust. Obviously, this operation is effected in both directions.

The speed at which the piston of air cylinder 44 is operated is controlled by speed control valves 318. The speed is such that deliveries II and III will be moved a distance equal to the thickness of a shingle for each impulse received by the coil 316 of the timing device 315.

The bundle make-up trays IV and V are also controlled by the cam switch 170, switch 172 constituting the control for the bundle make-up tray IV and switch 173 constituting the control for bundle make-up tray V. Switch 172 is connected to the source of electrical energy by wires 319 and 310 and is connected to solenoid 320 by wire 321. Switch 173 is connected to the source of electrical energy by wires 322 and 310 and to the solenoid 323 by wire 324.

Switches 172 and 173 are automatically actuated by the cam switch 170. Assuming that the cam switch 170 is locked in slot 198, after a predetermined number of shingles has been delivered by the oscillator I, solenoid 293 is energized, releasing disk 193. After a lapse of time sufficient for the last shingle to enter the make-up tray V, switch 173 is actuated energizing the solenoid 323 which actuates the main piston thereof to lower the tray for unloading. When the tray V has been unloaded, the switch 173 is released by its cam which deenergizes the solenoid 323 and tray V is automatically elevated again to its tilted shingle receiving position by its air cylinder. This entire operation is performed during the travel of cam switch 170 from slot 198 to slot 197 and is duplicated for tray IV when cam switch 170 is rotated from slot 197 to slot 198.

Both of the trays IV and V are identical and are actuated in the following manner. The solenoid valve 320 is normally open and air enters the bottom of air cylinder 113 through tube 325 and exhausts through tube 326 to protract the piston of the cylinder 113 and raise the tray IV. When the solenoid 320 is energized, air cylinder 113 will operate to retract the piston thereof to lower the tray IV. In switching from one product to another, it is necessary that the bundle make-up trays be cleared of all bundles and a switch 327 is provided to enable the air cylinder 113 to be manually operated.

The switch 327 is connected to the source of electrical energy by wire 328 and to the solenoid 320 by wire 329.

To reject defective shingles, the oscillator I and deliveries II and III are adjusted by means of a switch 330 which is actuated by coil 331 and connected to push button 332. The switch 330 is normally open and when energized closes to energize the circuits to the various units. Coil 331 has its positive terminal connected by wire 333 to the push button 332 which is in turn connected to the source of electrical energy. The negative terminal of coil 331 is connected to the opposite terminal of the source of electrical energy by wire 334. Switch 330 is connected to the source of electrical energy by wire 335.

The double throw switch 299 is normally closed in the manner shown. The purpose of switch 299 is to return the oscillator I to its upper position for handling rejects should the oscillator I happen to be in its lower position when the push button 332 is actuated by the operator. Coil 336 of switch 299 is connected to the switch 330 by wires 337 and 338, and to the source of electrical energy by wire 339. When switch 330 is closed, coil 336 is energized and switch 299 is closed at its terminal 340 to by-pass the switch 176 to energize the solenoid 297 and cause the air cylinder 19 to move oscillator I to its upper position. Also, when the reject circuit is energized, a switch 341 is opened, the switch 341 being in the circuit leading to the mercury switch 305 to deenergize this circuit and permit the oscillator I to return to its lower position if it were moved from this position to handle rejects.

The circuit actuating the photoelectric cell 201 is provided with a switch 342 which is normally closed and when coil 343 is energized by the reject circuit, the switch 342 opens to thereby prevent the counting of defective shingles.

When the reject circuit is deenergized by again depressing the push button 332 all of the affected units return to their original positions so that normal operation is ready to be resumed.

All of the air cylinders are connected to a common air supply 304 which is provided with a shut-off valve 344. In addition, pressure regulators 345 are provided at convenient points to control the operating air pressure to the various pilot valves and air cylinders. All of the cylinders are provided with speed control valves.

Cam shaft 178 of cam switch 170 is provided with a brake 346 which operates on brake drum 347 which is keyed to the cam shaft 178. This brake is normally off and cam shaft 178 is free for rotation. When production is interrupted, rendering photoelectric cell 210 inactive and opening the circuit from switch 315 as previously described, solenoid 348 is deenergized and the brake 346 is applied to stop the rotation of the cam shaft 178 and thus maintain the relative positions of the various switches 172–177 with respect to the units which they control. The brake 346 is actuated by solenoid 348 which is controlled by timing switch 315 which is actuated by the coil 316 which is connected to the photoelectric cell 210 by wires 317 and 291. The other terminal of the coil 316 is connected to the source of electrical energy by wire 313.

Bundle unloaders VII and VIII comprise a series of wheels 120 secured to shafts 121, the shafts being mounted for rotation in bearings 122. As previously indicated, the wheels 120 underlie the plate 90 of the bundle make-up trays and project through the perforations 91 in the plate 90 when the trays are lowered so that the single bundle is received upon and supported by the wheels 120. Preferably, and in accordance with a feature of the invention, the bundle unloaders VII and VIII are split into two separately driven sections (Figs. 3A, 11 and 12) so that the sections underlying the plate 90 may be driven intermittently while the remaining section which feeds the bundle receivers IX and X is driven continuously.

Referring to Fig. 3A, it will be seen that the wheels 120 in each section are driven by two belts, the unloading section being driven by belts 123 and 124 and the bundle feeding section being driven by belts 125 and 126. Each of the shafts 121 are provided with hubs 127 which are keyed to shafts and idler hubs 128, the belts running over and under the hubs 127 and 128, and being preferably driven at the same speed.

Referring to Figs. 11 and 12, shaft 129 is driven by a motor 130, a rotation of the shaft 129 being intermittently transmitted to a sleeve 131 of a magnetic clutch assembly 132, this clutch assembly being controlled by a switch 133. Therefore, sprocket 134 is intermittently rotated and chain 135 transmits rotation of the sprocket 134 to the sprockets 136 and 137. On the other hand, the wheels 120 of the bundle feed section are continuously rotated by sprocket 138 keyed to the shaft 129 and rotation is transmitted by chain 139 to sprockets 140 and 141. The cam switch 133 is continuously rotated by the shaft 129 through chain 142 and sprockets 143 and 144.

As will be more particularly described hereinafter, the cam switch 133 in conjunction with the intermittently operated unloading section of the unloading wheels enables individual portions of the shingle bundle formed on the unloading trays IV and V to be separated and individually fed to the bundle receivers IX and X.

Shingles in being deposited on the bundle make-up trays IV and V will deviate slightly to left or right with respect to the center lines of deliveries II and III and a certain amount of overlapping will occur on the bundle make-up trays IV and V. The bundle feed section of the unloaders VII and VIII operate at a higher speed than that of the intermittently driven unloading section and the bundles delivered to the bundle receivers IX and X are squared up by impact against stop 153. The speed of the bundle feed section is such that the bundles are thrown against stop 153, the highest point of the bundle receivers IX and X being below the surface of wheel 120, and rollers 145 being at an angle to facilitate the movement of the bundles against stop 153.

Shingle bundles supplied by the unloaders VII and VIII are received on bundle receivers IX and X which form part of a live roll conveyor, the bundle receivers being inclined into a non-rotating receiving position in which the shingle bundles are received upon a series of idler rollers 145 while these rollers are stationary, e.g. are not rotated by contact with the continuously driven belt 146 of the live roll conveyor XI.

As can be seen in Fig. 12, the rollers 145 are mounted on a hollow frame 147 which surrounds the belt 146, the frame 147 being pivoted at one side by support 148 which is pivotally secured at 149 and supported at the other side by air cylinder 150. The pivot 149 is mounted upon support 151 which is adjustable by means of screw 152 so that the height of the pivot 149 may be controlled. The numeral 153 designates a stop plate which limits the travel of the shingle bundles along the lengths of the idler rollers 145. The plate 153 is supported at both ends by bars 154 which are slidably mounted for protraction and retraction by means of an air cylinder 155 and piston 156. Stop 153 can be manually adjusted to accommodate bundles of different width by adjusting the position of bars 154 which are held in place by nut 154' (Fig. 12). Thus, the position of the shingle bundles on the live roll conveyor XI can be adjusted so that these shingle bundles will be properly positioned with respect to the carton blanks which are later positioned therebeneath. In this regard, only sta-fast shingles possess interfering projections and the stop 153 is notched to accommodate these projections and the air cylinder 155 is employed to enable the stop 153 to be moved clear of the shingles when the frame 147 is lowered.

Sta-fast and hexagon shingles are handled by depositing the shingle bundle formed on the bundle make-up trays IV and V onto the bundle receivers as a single bundle. On the other hand, thick butt shingles are handled differently as will be later more fully explained, and operation of the bundle unloaders VII and VIII and the bundle receivers IX and X will first be described with reference to the stacking and conveying of products in which the bundle formed on the bundle make-up trays IV and V is not disturbed.

When the formation of a shingle bundle is completed on one of the bundle make-up trays, this tray is then lowered until the unloading wheels 120 support the shingle bundle and the wheels 120 are then rotated to remove the shingle bundle from the bundle make-up tray. The shingle bundle then proceeds to the bundle receiver feeding section of the unloader and actuates switch 443 (Fig. 3A) which deenergizes the magnetic clutch 132 stopping the tray unloading section of the unloader. The shingle bundle is then delivered to the bundle receivers by the continuously operated feeding end of the unloader. After the shingle bundle has been received upon the rollers 145, the air cylinder 150 lowers the frame 147 until the lower surfaces of the rollers 145 are in contact with and driven by the belt 146 of the of the live roll conveyor XI.

After the shingle bundle has been conveyed away by the live roll conveyor XI the air cylinder 150 is actuated to again raise the rollers 145 into a bundle receiving position. This cycle of operations is repeated whenever the bundle make-up tray has been completely stacked. Preferably, the magnetic clutch 132 is a combination clutch in that when the clutch is deenergized, a brake is applied to stop the rotation of the wheels 120 in the tray unloading section of the unloader instantly. This feature is particularly important in the stacking of thick butt shingles which are of non-uniform cross section and which must be given special handling to enable the formation of square bundles which can be safely stored.

Typical thick butt shingles are thicker on one side than they are on the other and it is accordingly necessary, in order to produce a bundle which is relatively square and which can be safely stored, to have some of the shingles in the bundle facing in a direction opposite to the remaining shingles in the bundle so as to compensate for the aforesaid inequality in thickness.

In accordance with the invention, the shingle bundle can be produced layer by layer to form a shingle bundle containing, for example, three layers. Each layer can consist of nine shingles and alternate layers can face in opposite directions so as to provide a final product containing thick butt shingles in which the thick portions of the shingles occur at both sides of the bundle. The cutting pattern for thick butt shingles is such that the thick portion of each adjacent shingle is alternated as for example, assuming the shingles are fed four abreast, the thick portions of the outer shingles will be on the outside and the thick portions of the inner shingles will be on the inside. Therefore, when nine rows of shingles are deposited upon one of the trays IV or V, the plate 90 can be lowered and the unloading wheels 120 can be caused, by means of suitable intermittent operation thereof, to convey away portions of superposed shingles one load at a time. These individual loads (there being four individual loads formed on the bundle make-up trays) is fed successively to the bundle receivers IX and X which are partially lowered after receiving each load so as to be in a position to receive the following load. When the desired number of layers, as for example three, have been superposed one atop the other on the bundle receiver, the bundle receiver is further lowered to cause the bundle formed thereon to be carried away.

Of one lot of shingles consisting of four stacks only three stacks are used for making up a bundle, leaving one stack to be disposed of with the next lot. In order to prevent the accumulation of stacks on the bundle unloader, the bundles are made up in cycles requiring three lots, or twelve stacks. If each stack were numbered consecutively from one to four, and each lot designated by the letter A, B and C, the individual stacks would then be identified as 1A, 2A, 3A, 4A for the first lot; 1B, 2B, 3B and 4B for the second lot; and finally 1C, 2C, 3C and 4C for the third lot. These designations are used in the following tabulation and the cycle can be followed by reading downward:

FIRST LOT A
*(One third cycle)*

Function:
Load 1A (1st layer of 1st bundle)    Operation of transfer IX and X
Load 2A (2nd layer of 1st bundle)    Adjust position
Load 3A (3rd layer of completed 1st bundle)    Unload and return to upper position
Load 4A (1st layer of 2nd bundle)    Adjust position

SECOND LOT B
*(One third cycle)*

Load 1B (2nd layer of 2nd bundle)    Adjust position
Load 2B (3rd layer completes 2nd bundle)    Unload and return to upper position
Load 3B (1st layer of 3rd bundle)    Adjust position
Load 4B (2nd layer of 3rd bundle)    Adjust position

THIRD LOT C
*(One third cycle)*

Load 1C (3rd layer completes 3rd bundle)    Unloads and returns to upper position
Load 2C (1st layer of 4th bundle)    Adjust position
Load 3C (2nd layer of 4th bundle)    Adjust position
Load 4C (3rd layer completes 4th bundle)    Unload and return to upper position All stacks have been disposed of and the bundle unloader is now empty. When the next lot is received, the above cycle will be repeated.

Two cam switches 133 are utilized to control the unloading and conveying operations, one for unloader VII and bundle receiver IX and one for unloader VIII and bundle receiver X. These cam switches are identical and the wiring diagram for one of these switches is shown in Fig. 10, the other cam switch being identically wired. Fig. 10 also shows the wiring diagram for the clutches which operate the carton dispenser XIV and pushing device XIII.

Cam switch 133 is identical in construction to the cam switch 170 shown in Figs. 4 and 8 with the exception that the cam shaft 178 of switch 170 carries two groups of three cam switches while the corresponding cam shaft of switch 133 carries three groups of three cam switches. The other difference is that the cam disk 193 of switch 170 has two slots 197 and 198 positioned 180° apart while the corresponding cam disk of cam switch 133 has three slots which are positioned 120° apart.

As previously indicated, cam switch 133 (Figs. 11 and 12) contains three groups of switches, switches 401, 402 and 403 constituting a group of switches used for sta-fast shingles, switches 404, 405 and 406 constituting a group of switches used for hexagon shingles and switches 407, 408 and 409 constituting a group of switches used for thick butt shingles. Each of these groups of switches is independent of the others and the desired group of switches is placed in operation by depression of one of the push buttons 410, 411 and 412. Thus, depression of push button 412 energizes coil 413 closing the normally open magnetic type switch 414 to complete an electric circuit through the group of switches 407, 408 and 409. The remaining groups of switches are similarly actuated by push buttons 410 and 411.

Switches 403, 406 and 409 lead to a common wire 415 leading to coil 416 which actuates switch 417, the switch 417 controlling the operation of magnetic clutch 132 which governs the intermittent rotation of the unloading section of unloaders VII and VIII. Switches 402, 405 and 408 are connected to the common wire 418 leading to solenoid 419 of valve 420, the solenoid 419, when energized, protracting the piston of air cylinder 150 to raise bundle receiving rollers 145 into bundle loading position. Switches 401, 404 and 407 are connected to common wire 421 leading to solenoid 422, the solenoid 422, when energized, retracting the piston of air cylinder 150 to lower bundle receiving rollers 145 into bundle unloading position.

The valve 420 is normally closed and, as stated is provided with two solenoids 419 and 422. Interposed between the valve 420 and air cylinder 150 is a master valve 423 which is governed by the solenoid 419 and a master valve 424 governed by the solenoid 422. The valve 420 is connected by tube 425 to an air supply line 426. The master valves 423 and 424 are connected to the air supply 427 by tubes 428 and 429 and to the valve 420 by tubes 430 and 431.

Master valves 423 and 424 are of the normally open diaphragm type, the diaphragm being actuated by air from the valve 420. When the solenoids 419 and 422 are deenergized, the valve 420 is closed and no air is admitted to the diaphragms of master valves 423 and 424 so that air enters both ends of the air cylinder 150 to thereby balance its piston. When either one of the solenoids 419 and 422 is energized, the air cylinder 150 is affected. Assuming solenoid 419 is energized, air is admitted to the master valve 423 closing the diaphragm thereof and shutting off the air supply through the valve 423 to the air cylinder 150. At the same time, valve 423 functions to vent the air cylinder 150 thus overbalancing the piston and allowing the same to be moved by the action of the air previously supplied from the master valve 424. When the solenoid 422 is energized, air cylinder 150 is affected in the same manner, but the piston is moved in the opposite direction.

The air circuit just described permits the piston of air cylinder 150 to be stopped at any position. Thus, by suitable operation of air cylinder 150, the bundle receiving rollers 145 may be stopped at intermediate elevations in order to form a square bundle from thick butt shingles by stacking portions of the shingle bundles received on the bundle make-up trays IV and V in alternate layers as previously described.

The speed of air cylinder 150 is controlled by speed control valves 432, which are manually set, and the distance traveled by the piston is governed by the length of time the solenoids 419 and 422 are energized by their respective switches. The air pressure is regulated and maintained uniform by pressure regulating valve 433.

The unloading wheels 120 of the unloading sections of the unloaders VII and VIII are driven through magnetic clutches 132 which are energized by the cam switches. Since these clutches require direct current, a selenium rectifier 434 is provided which converts the alternating current supplied to direct current. The selenium rectifier 434 is connected to the one leg of the source of electric current by wires 435 and 436 and to the other leg by wire 437. Direct current is transmitted to one terminal of magnetic clutch 132 by wires 438 and 439, through switch 417 and then wire 440. Direct current is transmitted to the other terminal of magnetic clutch 132 by wires 441 and 442.

The switch 443 is a double throw switch being normally open to the solenoid 444 and normally closed to the switch 417. The switch 443 is located in the unloader section and one of these switches is employed for each of the unloaders VII and VIII and this switch is actuated by contact with the shingle bundles. Switch 443 is connected to one leg of the source of electric current by wire 445 and to coil 416 by wire 446. Solenoid 444 is connected to the source of electric current by wire 447.

As stated, switch 443 is normally closed to the switch 417 and the operating frequency of clutch 132 is controlled directly by the operating one of the switches 403, 406 or 409. Assuming that bundles are approaching the switch 443 (Fig. 12), this switch will be actuated by the first bundle to enter the bundle feed section of the unloader. Accordingly, when the switch 443 is actuated by the shingle bundle, the circuit to switch 416 is opened deenergizing the clutch 132 and stopping the wheels 120 of the tray unloading section of the unloader. Additionally, the circuit to solenoid 444 is closed and the cam switch 133 is released and driven.

When the shingle bundle is delivered to the bundle receivers, the switch 443 is released closing the circuit to switch 417 and, therefore, the clutch 132 is only energized when one of the three switches 403, 406 or 409 is closed along with the switch 443. After the shingle bundle is delivered to the bundle receivers, ample time is permitted to elapse for the bundle receiver to unload its bundle (if the shingles are hexagon or sta-fast shingles) or for the bundle receiving rollers 145 to be partially lowered (as in the handling of thick butt shingles) before the clutch 132 is again energized to enable rotation of the wheels 120 of the tray unloading section of the unloader. When the clutch 132 is again energized by the cam switch 133, another bundle will be delivered to the bundle feeding section of the unloader and the cycle will be repeated.

The live roll conveyor XI (Figs. 3A and 3B) is a conventional conveyor consisting of a series of idler rollers 211 mounted within a frame 212 with anti-friction bearings. The rollers 211 are driven by belt 146 which contact the under surfaces thereof. No rollers 211 are employed in the areas occupied by the bundle receivers IX and X, this space being occupied by the rollers 145. The undersurface of the belt 146 is supported by back-up rollers 213 which are positioned intermediate rollers 211 to insure contact of the rollers 211 with the belt 146. Transfers IX and X are equipped with alternating large and small rollers, the small rollers being directly above the back-up rollers 213 to insure rotation of all of the rollers 145.

The bundle receiver IX must be in its lowered position forming a part of the live roll conveyor XI to permit bundles conveyed away from the bundle receiver X to pass. It is, therefore, necessary to synchronize both bundle receivers and the speed of conveyor XI so that these units operate in unison.

Assuming that tray IV is being loaded and bundle receiver X is in the process of unloading, the bundle which is unloaded will travel on the live roll conveyor XI and before this bundle reaches receiver IX, receiver IX will have received a bundle and moved to its unloading position. Thus, the bundle received by receiver IX will be discharged and the receiver IX will be in its lower position so that the bundle discharged from the receiver X will pass across the receiver IX toward the gravity conveyor XII. Should the normal operating procedure of the two bundle make-up units be disrupted so that they are no longer in synchronization, the receivers IX and X will operate independently.

Referring to Fig. 16, when receiver IX is raised and the passage is not clear for a bundle discharge from the receiver X, a bundle approaching receiver IX on the live roll conveyor XI will actuate switch 214, stopping the motor 215 which drives the live roll conveyor XI. The motor 215 will remain stopped until the receiver IX is again in its unloading position, at which time the motor 215 will start automatically.

Motor 215 is also controlled by a second switch 216 which, unlike switch 214, is normally open while switch 214 is normally closed. When receiver IX is raised, and switch 214 is opened by the presence of a bundle from receiver X, both circuits to the motor 215 are open and the motor stops and remains stopped until lowering of receiver IX closes the switch 216. When receiver IX is lowered, actuation of switch 214 by a bundle has no effect.

The carton dispenser XIV (Figs. 1B and 13) supplies cartons to a position underlying the gravity conveyor XII. Cartons are stacked in bin 220 which is open on two sides for accessibility. The bin 220 has no bottom and the cartons within the bin rest directly on belts 221 which are supported by the plate 222. The front end of bin 220 is preferably inclined to offset the cartons and improve the feeding thereof to the feed rolls 223 although a bin with a vertical front end will function acceptably.

The belts 221 are carried by pulleys, head pulley 224 being shown. The pulley 224 is driven intermittently by a magnetic clutch 225 (see Fig. 14) on the shaft 226 through sprockets 227 and 228. The clutch 225 is controlled by switch 229 which is positioned on a conveyor of any type which carries away the superposed shingle bundle and carton produced in accordance with the invention. Therefore, when a superposed shingle bundle and carton is discharged from the apparatus of the invention, the switch 229 is actuated to cause another carton to be supplied.

At the outlet of the carton dispenser XIV are four rubber covered feed rolls 223 which are driven together by chain and sprockets (see Fig. 13). The rolls 223 receive the cartons from the dispenser and feed them between plates 232.

The numeral 233 indicates idler rollers which are installed in a frame and thereby constitute the gravity conveyor which receives the shingle bundles discharged from the live roll conveyor XI. Above the conveyor XI is a pusher mechanism XIII which pushes the bundles and at the same time aligns each bundle with a carton and forces the carton forwardly until the carton directly underlies the shingle bundle. The pusher XIII is constituted by two chains 234 which operate on sprockets 235. Between the chains and carried thereby is a bar 236 provided with short pusher lugs 237 which engage the bundles and long lugs 238 which engage the cartons. The pusher XIII is controlled by a switch 239 which is positioned along the gravity conveyor XII where it will be engaged by the shingle bundles supplied thereto from the live roll conveyor XI. Switch 239 functions by actuating clutch 240 and a timing device is interposed in the electric circuit to the clutch 240 so that a closed circuit is maintained for a given period of time until the shingle bundle has lost contact with the switch 239.

The wiring diagram for the pusher XIII and the carton dispenser XIV is shown in Fig. 10 where the magnetic clutch 240 which drives the pusher XIII and the magnetic clutch 225 which drives the carton dispenser XIV can be seen. One terminal of the clutch 240 is wired to selenium rectifier 434 by wire 438, through switch 449 and wire 448, and the other terminal of clutch 240 is wired to selenium rectifier 434 by wires 442 and 441. One terminal of clutch 225 is connected to selenium rectifier 434 by wire 438 through switch 450 and wire 451 and the other terminal by wires 442 and 441.

Switches 239 and 229 are connected to one leg of a source of electric current by wires 436 and 447 and to coils 452 and 453. The coils 452 and 453 are connected to the source of electric current by wires 454 and 437.

Switches 449 and 450 are actuated by coils 452 and 453 respectively and are timing switches which remain closed for a predetermined time. When switch 229 is actuated by a bundle, coil 453 is energized closing the switch 450, energizing clutch 225 and placing the pusher XIII in operation. Switch 450 remains closed until the bundle has been discharged from the gravity conveyor XII onto another conveyor which operates at a greater rate of speed so as to carry the bundles away from the pushing lugs 237 and 238. After the bundle is free of the pusher, switch 450 opens and clutch 225 is de-energized to stop the pusher XIII until the switch 239 is again actuated.

When the shingle bundle with underlying carton is clear of the gravity conveyor XII, it actuates switch 229 which energizes coil 452 closing switch 449 which energizes clutch 240 and the belts 221 are moved to convey another carton between the guide plates 232. When the switch 229 is released by the bundle, switch 232 remains closed for a time sufficient to feed a single carton after which the switch 449 remains open until the switch 229 is again actuated by the next bundle.

The carton dispenser XIV is supported upon a frame 241, the frame being preferably mounted on wheels which are not shown so that the carton dispenser XIV may be properly positioned with respect to the guide plates 232 so that each carton is fed to a proper position beneath the bundle. To further assist in enabling the carton dispenser XIV to have its distance adjusted with respect to the guide plates 232, guide plates 242 are also provided, the plates 242 being slidable within a flared portion 243 on the carton dispenser side of the guide plates 232. Accordingly, different sized cartons can be actuated by moving the carton dispenser XIV the proper distance from the guide plates 232 and adjusting the sliding guide plates 242 in the flared portion 243.

I claim:

1. Apparatus for transporting and stacking sheets of material comprising an upper delivery having a receiving end and a discharge end, a lower delivery parallel with said upper delivery and having a receiving end and a discharge end, said receiving ends of said deliveries being vertically spaced in approximate horizontal alignment and said discharge ends being longitudinally spaced apart, means to direct sheets of material to the receiving end of either of said deliveries, receiving trays positioned adjacent the discharge ends of said deliveries for reception of sheets of material discharged therefrom to form a bundle thereof, a conveyor parallel with said deliveries and laterally spaced therefrom and means to discharge said bundle from said receiving trays at right angles to the direction of said deliveries and deposit said bundle upon said conveyor, said sheets of material being continuously supplied in non-separated condition, means comprising a pair of superposed conveyors operating at a velocity in excess of the velocity of said supply to longitudinally separate said sheets, and said deliveries being provided with retarding belts superposed thereabove to reduce the velocity of the sheets moving thereon, the sheets of material being continuously supplied and fed to said directing means in a longitudinally separated condition.

2. Apparatus for transporting and stacking sheets of material comprising an upper delivery having a receiving end and a discharge end, a lower delivery parallel with said upper delivery and having a receiving end and a discharge end, said receiving ends of said deliveries being vertically spaced in approximate horizontal alignment and said discharge ends being longitudinally spaced apart, means to direct sheets of material to the receiving end of either of said deliveries, receiving trays positioned adjacent the discharge ends of said deliveries for reception of sheets of material discharged therefrom to form a bundle thereof, a conveyor parallel with said deliveries and laterally spaced therefrom, means to discharge said bundle from said receiving trays at right angles to the direction of said deliveries and deposit said bundle upon said conveyor, means to count the sheets fed to said delivery, means responsive to said counting means and operatively associated with said directing means to shift said directing means between an upper delivery feeding position and a lower delivery feeding position, said receiving trays being pivotally mounted to shift between an inclined sheet receiving position and a horizontal position, and means responsive to said counting means to raise and lower said deliveries.

3. Apparatus for transporting and stacking sheets of material comprising an upper delivery having a receiving end and a discharge end, a lower delivery parallel with said upper delivery and having a receiving end and a discharge end, said receiving ends of said deliveries being vertically spaced in approximate horizontal alignment and said discharge ends being longitudinally spaced apart, means to direct sheets of material to the receiving end of either of said deliveries, receiving trays positioned adjacent the discharge ends of said deliveries for reception of sheets of material discharged therefrom to form a bundle thereof, a conveyor parallel with said deliveries and laterally spaced therefrom, means to discharge said bundle from said receiving trays at right angles to the direction of said deliveries and deposit said bundle upon said conveyor, means to count the sheets fed to said delivery, means responsive to said counting means and operatively associated with said directing means to shift said directing means between an upper delivery feeding position and a lower delivery feeding position, and means responsive to said counter to move said delivery step by step as sheets are deposited thereon to maintain a fixed distance between the discharge end of said deliveries and the bundle on said trays as the bundle is formed.

4. Apparatus for transporting and stacking sheets of material comprising an upper delivery having a receiving end and a discharge end, a lower delivery parallel with said upper delivery and having a receiving end and a discharge end, said receiving ends of said deliveries being vertically spaced in approximate horizontal alignment and said discharge ends being longitudinally spaced apart, means to direct sheets of material to the receiving end of either of said deliveries, receiving trays positioned adjacent the discharge ends of said deliveries for reception of sheets of material discharged therefrom to form a bundle thereof, a conveyor parallel with said deliveries and laterally spaced therefrom, means to discharge said bundle from said receiving trays at right angles to the direction of said deliveries and deposit said bundle upon said conveyor, means to count the sheets fed to said delivery, means responsive to said counting means and operatively associated with said directing means to shift said directing means between an upper delivery feeding position and a lower delivery feeding position, said tray being provided with a plurality of perforations and bundle unloading wheels being positioned beneath said tray, said wheels protruding through said perforations when said tray is horizontal in its lowermost position.

5. Apparatus for transporting and stacking sheets of material comprising an upper delivery having a receiving end and a discharge end, a lower delivery parallel with said upper delivery and having a receiving end and a discharge end, said receiving ends of said deliveries being vertically spaced in approximate horizontal alignment and said discharge ends being longitudinally spaced apart, means to direct sheets of material to the receiving end of either of said deliveries, receiving trays positioned adjacent the discharge ends of said deliveries for reception of sheets of material discharged therefrom to form a bundle thereof, a conveyor parallel with said deliveries and laterally spaced therefrom and means to discharge said bundle from said receiving trays at right angles to the direction of said deliveries and deposit said bundle upon said conveyor, said conveyor being a live roll conveyor in which a plurality of idler rollers are superimposed upon a driving belt and spaced groups of said rollers being mounted for movement out of engagement with said driving belt into an inclined bundle receiving position.

6. Apparatus for transporting and stacking sheets of material as recited in claim 5 in which a gravity conveyor is positioned to receive bundles discharged from said live roll conveyor, means are provided to feed carton blanks to a position underlying said gravity conveyor and means are provided to simultaneously convey a bundle on said gravity conveyor and a carton blank underlying said gravity conveyor.

7. Apparatus for transporting and stacking sheets of material as recited in claim 6 in which said feeding means comprises a conveyor overlying said gravity conveyor said overlying conveyor carrying a pusher bar provided with outer long pushing fingers and inner short pushing fingers.

8. Apparatus for transporting and stacking sheets of material as recited in claim 5 in which a carton guide underlies said gravity conveyor, said carton guide having a forward extremity terminating in an upwardly inclined portion directing said carton blank between adjacent rollers of said gravity conveyor to a position intermediate a bundle and the rollers of said gravity conveyor.

9. Apparatus for transporting and stacking sheets of material as recited in claim 5 in which said belt is driven by a motor connected to an electrical circuit containing two switches, said circuit being completed unless both of said switches are open, the first of said switches being normally closed and being positioned on said live roll conveyor intermediate said spaced groups of rollers and the second of said switches being normally open and being closed when the forward of said spaced groups of rollers contacts said belt.

10. Apparatus for transporting and stacking sheets of material comprising an upper delivery having a receiving end and a discharge end, a lower delivery parallel with said upper delivery and having a receiving end and a discharge end, said receiving ends of said deliveries being vertically spaced in approximate horizontal alignment and said discharge ends being longitudinally spaced apart, means to direct sheets of material to the receiving end of either of said deliveries, receiving trays positioned adjacent the discharge ends of said deliveries for reception of sheets of material discharged therefrom to form a bundle thereof, a conveyor parallel with said deliveries and laterally spaced therefrom, and means to discharge said bundle from said receiving trays at right angles to the direction of said deliveries and deposit said bundle upon said conveyor, said upper and lower deliveries being pivotally mounted at their receiving ends and being mechanically interlocked so that movement of one of said deliveries in one direction is accompanied by an opposite movement of the other of said deliveries.

11. Apparatus for transporting and stacking sheets of material as recited in claim 10 in which the downward movement of said lower delivery is limited by a stop and said mechanical interlinkage is slidably mounted with respect to said lower delivery so that said upper delivery may be raised beyond the elevation at which further downward movement of said lower delivery is resisted by said stop.

12. Apparatus for transporting and stacking sheets of material as recited in claim 10 in which a reject conveyor is provided above the tray associated with said upper delivery whereby defective sheets may be discarded by raising said upper delivery to a position in which sheets delivered therefrom are deposited upon said reject conveyor.

13. Apparatus for transporting and stacking sheets of material as recited in claim 12 in which means are provided to count the sheets fed to said deliveries, means are provided responsive to said counter for shifting said directing means, raising and lowering said deliveries and raising and lowering said trays, all in timed relation, and means are provided to raise said upper delivery to a position in which sheets delivered therefrom are deposited upon said reject conveyor while simultaneously inactivating said counter and without disturbing said timed relation when said upper delivery is returned to the position from which it was raised.

14. Apparatus for transporting and stacking sheets of material as recited in claim 13 in which said upper delivery is raised by means of an overhead cable and a first means is employed to act upon said cable to raise and lower said upper delivery in timed relation with the raising and lowering of the tray associated therewith and a second means is employed to act upon said cable to raise and lower said upper delivery into association with said reject conveyor.

15. Apparatus for transporting and stacking sheets of material as recited in claim 14 in which said first and second means acting upon said cable comprise independent fluid-operated cylinders with associated pistons, said second means being movable only between fully protracted and fully retracted positions.

16. Apparatus for transporting and stacking sheets of material as recited in claim 14 in which said reject conveyor is positioned so that said second means acting upon said cable will raise the discharge end of said upper delivery at least to a level even with said reject conveyor when said upper delivery is in its lowermost position and said upper delivery is provided with means interengaging with said reject conveyor whereby further elevation of said upper delivery will also elevate said reject conveyor.

17. Apparatus for transporting and stacking sheets of material comprising an upper delivery having a receiving end and a discharge end, a lower delivery parallel with said upper delivery and having a receiving end and a discharge end, said receiving ends of said deliveries being vertically spaced in approximate horizontal alignment and said discharge ends being longitudinally spaced apart, means to direct sheets of material to the receiving end of either of said deliveries, receiving trays positioned adjacent the discharge ends of said deliveries for reception of sheets of material discharged therefrom to form a bundle thereof, a conveyor parallel with said deliveries and laterally spaced therefrom, said trays being perforated and movable between an inclined sheet-receiving position and a horizontal discharge position, and means to discharge said bundle from said receiving trays at right angles to the direction of said deliveries and deposit said bundle upon said conveyor, said discharging means comprising a series of wheels constituting a conveyor extending between a position underlying said trays and a point on the conveyor parallel with said deliveries, the wheels underlying said trays protruding through the perforations thereof when said trays are lowered, the wheels underlying said trays being intermittently driven while the wheels adjacent the conveyor parallel with said deliveries are continuously driven.

18. Apparatus for transporting and stacking sheets of material as recited in claim 17 in which a bundle actuated switch is positioned in the continuously driven section of said wheels so that contact of said switch by the bundle discharged from said trays discontinues rotation of the wheels underlying said trays.

19. Apparatus for transporting and stacking sheets of material as recited in claim 18 in which said conveyor parallel with said deliveries is a live roll conveyor in which a plurality of idler rollers are superimposed upon a driving belt and spaced groups of said rollers are pivotally mounted for movement out of engagement with said driving belt into a plurality of inclined bundle receiving positions.

20. Apparatus for transporting and stacking sheets of material comprising an upper delivery having a receiving end and a discharge end, a lower delivery parallel with said upper delivery and having a receiving end and a discharge end, said receiving ends of said deliveries being vertically spaced in approximate horizontal alignment and said discharge ends being longitudinally spaced apart, means to direct sheets of material to the receiving end of either of said deliveries, receiving trays positioned adjacent the discharge ends of said deliveries for reception of sheets of material discharged therefrom to form a bundle thereof, said sheets of material being continuously supplied in non-separated condition, means comprising a pair of superposed conveyors operating at a velocity in excess of the velocity of said supply to longitudinally separate said sheets, and said deliveries being provided with retarding belts superposed thereabove to reduce the velocity of the sheets moving thereon, the sheets of material being continuously supplied and fed to said directing means in a longitudinally separated condition.

21. Apparatus for transporting and stacking sheets of material comprising an upper delivery having a receiving end and a discharge end, a lower delivery parallel with said upper delivery and having a receiving end and a discharge end, said receiving ends of said deliveries being vertically spaced in approximate horizontal alignment and said discharge ends being longitudinally spaced apart, means to direct sheets of material to the receiving end of either of said deliveries, receiving trays positioned adjacent the discharge ends of said deliveries for reception of sheets of material discharged therefrom to form a bundle thereof, means responsive to the number of sheets in said trays operatively associated with said directing means to shift said directing means between an upper delivery feeding position and a lower delivery feeding position, said receiving trays being pivotally mounted to shift between an inclined sheet-receiving position and a horizontal position, and means responsive to the number of sheets in said trays to raise and lower said trays.

22. Apparatus for transporting and stacking sheets of material comprising an upper delivery having a receiving end and a discharge end, a lower delivery parallel with said upper delivery and having a receiving end and a discharge end, said receiving ends of said deliveries being vertically spaced in approximate horizontal alignment and said discharge ends being longitudinally spaced apart, means to direct sheets of material to the receiving end of either of said deliveries, receiving trays positioned adjacent the discharge ends of said deliveries for reception of sheets of material discharged therefrom to form a bundle thereof, means responsive to the number of sheets in said trays operatively associated with said directing means to shift said directing means between an upper delivery feeding position and a lower delivery feeding position, and means responsive to the number of sheets in said trays to move said deliveries step by step as sheets are deposited thereon to maintain a fixed distance between the discharge ends of said deliveries and the bundle on trays as the bundle is formed.

23. A method of transporting and stacking sheets of material comprising continuously supplying said sheets in longitudinally spaced condition, sequentially diverting said sheets in groups to separate deliveries, feeding said groups of sheets in overlying paths to longitudinally spaced stacking zones to form bundles thereof, discharging said formed bundles from said stacking zones at approximately right angles to said overlying paths, delivering said discharged bundles to spaced points along the length of a moving conveyor having spaced receiving zones thereon and stopping said conveyor when the receiving zone nearest the discharge end of said conveyor is about to receive a bundle and a bundle on said conveyor approaches the receiving zone nearest the discharge end of said conveyor.

References Cited in the file of this patent

UNITED STATES PATENTS

| | | |
|---|---|---|
| 1,295,195 | Parker | Feb. 25, 1919 |
| 1,460,059 | Fine | June 26, 1923 |
| 1,874,669 | Wagner | Aug. 30, 1932 |
| 1,950,192 | Reeve | Mar. 6, 1934 |
| 2,076,391 | Whitehead | Apr. 6, 1937 |
| 2,109,294 | Kimball | Feb. 22, 1938 |
| 2,540,072 | Wagner et al. | Feb. 6, 1951 |
| 2,604,971 | Snyder et al. | July 29, 1952 |
| 2,606,483 | Forbes | Aug. 12, 1952 |
| 2,697,388 | Hansen et al. | Dec. 21, 1954 |
| 2,713,959 | Gilbert | July 26, 1955 |